United States Patent
Fu et al.

(10) Patent No.: US 11,379,586 B2
(45) Date of Patent: Jul. 5, 2022

(54) MEASUREMENT METHODS, DEVICES AND SYSTEMS BASED ON TRUSTED HIGH-SPEED ENCRYPTION CARD

(71) Applicant: Alibaba Group Holding Limited, Grand Cayman (KY)

(72) Inventors: Yingfang Fu, Hangzhou (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 86 days.

(21) Appl. No.: 16/529,582

(22) Filed: Aug. 1, 2019

(65) Prior Publication Data
US 2020/0042709 A1 Feb. 6, 2020

(30) Foreign Application Priority Data
Aug. 2, 2018 (CN) .......................... 201810871817.4

(51) Int. Cl.
*G06F 12/14* (2006.01)
*G06F 21/57* (2013.01)
(Continued)

(52) U.S. Cl.
CPC .......... *G06F 21/572* (2013.01); *G06F 9/4401* (2013.01); *G06F 21/575* (2013.01);
(Continued)

(58) Field of Classification Search
CPC ...... G06F 21/575; G06F 21/57; G06F 21/572; G06F 21/64; G06F 21/565; G06F 9/4401;
(Continued)

(56) References Cited

U.S. PATENT DOCUMENTS 7,967,193 B1   6/2011   McGinley et al.
8,442,960 B1   5/2013   Meyer et al.
(Continued)

FOREIGN PATENT DOCUMENTS

CN   1553349       12/2004
CN   201051744 Y   4/2008
(Continued)

OTHER PUBLICATIONS

Olzak, Tom. "Chapter 8—UEFI and the TPM: Building a foundation for platform trust", <https://resources.infosecinstitute.com/topic/uefi-and-tpm-2/>. Jun. 2012. (Year: 2012).*
(Continued)

*Primary Examiner* — Michael Simitoski
(74) *Attorney, Agent, or Firm* — Lee & Hayes, P.C.

(57) ABSTRACT

Measurement methods, devices and systems based on a trusted high-speed encryption card are disclosed. One of the methods includes: a BIOS actively measuring at least one firmware in a device if an integrity measurement result made by a trusted security chip for the BIOS indicates that the integrity thereof is not corrupted; loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

20 Claims, 16 Drawing Sheets

---

S62: A BIOS ACTIVELY MEASURES THE INTEGRITY OF AN OPTION MEMORY FIRMWARE OF A TRUSTED HIGH-SPEED ENCRYPTION CARD IN A DEVICE WHEN AN INTEGRITY MEASUREMENT OF THE BIOS PERFORMED BY A TRUSTED SECURITY CHIP INDICATES THAT THE INTEGRITY THEREOF IS NOT CORRUPTED

S64: THE OPTION MEMORY FIRMWARE OF THE TRUSTED HIGH-SPEED ENCRYPTION CARD IS TRIGGERED TO MEASURE THE INTEGRITY OF ONE OR MORE FIRMWARE IN THE DEVICE WHEN THE INTEGRITY OF THE OPTION MEMORY FIRMWARE OF THE TRUSTED HIGH-SPEED ENCRYPTION CARD THAT IS ACTIVELY MEASURED BY THE BIOS IS NOT CORRUPTED

(51) Int. Cl.
*G06F 21/64* (2013.01)
*G06F 9/4401* (2018.01)
*H04L 9/32* (2006.01)
*G06F 11/30* (2006.01)

(52) U.S. Cl.
CPC ............ *G06F 21/64* (2013.01); *H04L 9/3234* (2013.01); *G06F 2221/033* (2013.01)

(58) Field of Classification Search
CPC ............ G06F 9/4411; G06F 2221/033; H04L 9/3234; H04L 9/0897; H04L 9/0643; H04L 41/082
See application file for complete search history.

(56) References Cited

U.S. PATENT DOCUMENTS

| | | | |
|---|---|---|---|
| 8,645,711 B2 | 2/2014 | Ohhashi | |
| 8,767,957 B1 | 7/2014 | Bagchi et al. | |
| 8,931,082 B2 | 1/2015 | Rodgers et al. | |
| 9,081,954 B2 | 7/2015 | Forristal | |
| 9,246,690 B1 | 1/2016 | Roth et al. | |
| 9,294,282 B1 | 3/2016 | Potlapally et al. | |
| 9,530,002 B1 | 12/2016 | Hamlin | |
| 9,893,882 B1 | 2/2018 | Thadishetty | |
| 10,211,977 B1 | 2/2019 | Roth et al. | |
| 10,891,366 B1 | 1/2021 | Wu et al. | |
| 11,026,628 B1 | 6/2021 | Bruinsma et al. | |
| 2003/0097581 A1* | 5/2003 | Zimmer | G06F 9/4411 726/10 |
| 2003/0188146 A1* | 10/2003 | Hale | G06F 9/30181 713/1 |
| 2004/0158828 A1* | 8/2004 | Zimmer | G06F 12/10 717/168 |
| 2004/0190721 A1 | 9/2004 | Barrett et al. | |
| 2005/0108564 A1* | 5/2005 | Freeman | G06F 21/575 726/26 |
| 2005/0166024 A1* | 7/2005 | Angelo | G06F 21/575 711/164 |
| 2005/0251857 A1* | 11/2005 | Schunter | G06F 21/57 726/16 |
| 2005/0262571 A1* | 11/2005 | Zimmer | G06F 21/57 726/27 |
| 2005/0289646 A1 | 12/2005 | Zimmer et al. | |
| 2006/0010326 A1* | 1/2006 | Bade | G06F 21/572 713/176 |
| 2006/0059369 A1 | 3/2006 | Fayad et al. | |
| 2006/0075223 A1* | 4/2006 | Bade | G06F 21/57 713/162 |
| 2006/0155988 A1* | 7/2006 | Hunter | G06F 21/575 713/164 |
| 2006/0289659 A1 | 12/2006 | Mizushima | |
| 2007/0094711 A1 | 4/2007 | Corley et al. | |
| 2007/0143543 A1 | 6/2007 | Lin et al. | |
| 2007/0154018 A1 | 7/2007 | Watanabe | |
| 2007/0294178 A1 | 12/2007 | Pinder et al. | |
| 2008/0005586 A1 | 1/2008 | Munguia | |
| 2008/0046581 A1 | 2/2008 | Molina et al. | |
| 2008/0072071 A1 | 3/2008 | Forehand et al. | |
| 2008/0077993 A1* | 3/2008 | Zimmer | G06F 21/575 726/27 |
| 2008/0126779 A1* | 5/2008 | Smith | G06F 21/575 713/2 |
| 2008/0192937 A1 | 8/2008 | Challener | |
| 2008/0223925 A1 | 9/2008 | Saito et al. | |
| 2008/0244746 A1 | 10/2008 | Rozas et al. | |
| 2008/0270781 A1* | 10/2008 | Ibrahim | G06F 21/57 713/2 |
| 2009/0043708 A9 | 2/2009 | Silverbook et al. | |
| 2009/0067689 A1* | 3/2009 | Porter | G06F 21/32 382/124 |
| 2009/0070593 A1* | 3/2009 | Boshra | G06F 21/32 713/186 |
| 2009/0144046 A1* | 6/2009 | Rothman | G06F 9/45516 703/27 |
| 2009/0172378 A1* | 7/2009 | Kazmierczak | G06F 21/575 713/2 |
| 2010/0011219 A1 | 1/2010 | Burton et al. | |
| 2010/0023747 A1* | 1/2010 | Asnaashari | G06Q 20/3563 713/150 |
| 2010/0082960 A1* | 4/2010 | Grobman | G06F 21/575 713/2 |
| 2010/0088499 A1* | 4/2010 | Zimmer | G06F 21/10 713/2 |
| 2010/0174652 A1 | 7/2010 | Shear et al. | |
| 2010/0281273 A1 | 11/2010 | Lee et al. | |
| 2011/0013773 A1 | 1/2011 | Pinder | |
| 2011/0211690 A1 | 9/2011 | Tu et al. | |
| 2011/0302638 A1 | 12/2011 | Cha et al. | |
| 2012/0151223 A1 | 6/2012 | Conde Marques et al. | |
| 2012/0185683 A1 | 7/2012 | Krstic et al. | |
| 2012/0201379 A1 | 8/2012 | Fuchs et al. | |
| 2012/0266252 A1* | 10/2012 | Spiers | H04L 9/3247 726/26 |
| 2012/0331285 A1* | 12/2012 | Bangerter | H04L 9/3234 713/155 |
| 2013/0016832 A1 | 1/2013 | Yamashita | |
| 2013/0104188 A1* | 4/2013 | Western | G06F 21/57 726/1 |
| 2013/0125204 A1 | 5/2013 | La Fever et al. | |
| 2013/0318343 A1 | 11/2013 | Bjarnason et al. | |
| 2014/0068766 A1 | 3/2014 | Klustaitis et al. | |
| 2014/0122897 A1 | 5/2014 | Dodeja et al. | |
| 2014/0140512 A1 | 5/2014 | Hadley | |
| 2014/0250291 A1 | 9/2014 | Adams et al. | |
| 2014/0256419 A1 | 9/2014 | Laputz et al. | |
| 2014/0258733 A1 | 9/2014 | Scott-Nash | |
| 2014/0298040 A1 | 10/2014 | Ignatchenko et al. | |
| 2014/0359268 A1 | 12/2014 | Jauhiainen et al. | |
| 2015/0012737 A1 | 1/2015 | Newell | |
| 2015/0074387 A1* | 3/2015 | Lewis | G06F 21/575 713/2 |
| 2015/0074392 A1 | 3/2015 | Boivie et al. | |
| 2015/0100299 A1 | 4/2015 | Abraham et al. | |
| 2015/0200934 A1 | 7/2015 | Naguib | |
| 2016/0026810 A1 | 1/2016 | Hagiwara et al. | |
| 2016/0065375 A1 | 3/2016 | Kahana et al. | |
| 2016/0070932 A1 | 3/2016 | Zimmer et al. | |
| 2016/0098283 A1* | 4/2016 | Martinez | G06F 9/44505 713/2 |
| 2016/0119141 A1 | 4/2016 | Jing et al. | |
| 2016/0142772 A1 | 5/2016 | Pinder et al. | |
| 2016/0306977 A1 | 10/2016 | Zarakas et al. | |
| 2017/0118018 A1 | 4/2017 | Dekker et al. | |
| 2017/0132159 A1* | 5/2017 | Joshi | G06F 3/0683 |
| 2017/0257365 A1 | 9/2017 | Gonzalez et al. | |
| 2017/0329685 A1 | 11/2017 | Jenkins et al. | |
| 2017/0364685 A1 | 12/2017 | Shah et al. | |
| 2018/0004980 A1 | 1/2018 | Kuczynski et al. | |
| 2018/0026969 A1 | 1/2018 | Newton et al. | |
| 2018/0069693 A1 | 3/2018 | Boivie et al. | |
| 2018/0091311 A1* | 3/2018 | Kisley | H04L 9/0877 |
| 2018/0091314 A1 | 3/2018 | Li et al. | |
| 2018/0101689 A1 | 4/2018 | Arnold et al. | |
| 2018/0109377 A1 | 4/2018 | Fu | |
| 2018/0157839 A1 | 6/2018 | Pearson | |
| 2018/0167268 A1* | 6/2018 | Liguori | G06F 9/445 |
| 2018/0174013 A1 | 6/2018 | Lee | |
| 2018/0288011 A1 | 10/2018 | Marquardt et al. | |
| 2018/0343110 A1 | 11/2018 | Funk | |
| 2018/0367317 A1 | 12/2018 | Forler et al. | |
| 2019/0036893 A1 | 1/2019 | Jiang | |
| 2019/0080099 A1 | 3/2019 | Roth et al. | |
| 2019/0095192 A1 | 3/2019 | Akita et al. | |
| 2019/0103961 A1 | 4/2019 | Chhabra et al. | |
| 2019/0108332 A1 | 4/2019 | Glew et al. | |
| 2019/0124054 A1* | 4/2019 | Zhang | H04L 63/0428 |
| 2019/0163910 A1 | 5/2019 | Moon et al. | |
| 2019/0213359 A1 | 7/2019 | Kepa et al. | |
| 2019/0259029 A1 | 8/2019 | Chilton et al. | |
| 2019/0268155 A1 | 8/2019 | Guo | |

(56) References Cited

U.S. PATENT DOCUMENTS

| | | |
|---|---|---|
| 2019/0311126 A1 | 10/2019 | Areno et al. |
| 2019/0334713 A1 | 10/2019 | Fu et al. |
| 2019/0384918 A1 | 12/2019 | Ndu et al. |
| 2019/0392151 A1 | 12/2019 | Lee et al. |
| 2020/0004967 A1 | 1/2020 | Fu et al. |
| 2020/0026882 A1 | 1/2020 | Fu et al. |
| 2020/0044841 A1 | 2/2020 | Fu et al. |
| 2020/0074088 A1 | 3/2020 | Fu |
| 2020/0074121 A1 | 3/2020 | Fu |
| 2020/0074122 A1 | 3/2020 | Fu et al. |
| 2020/0104528 A1 | 4/2020 | Fu |
| 2020/0117805 A1 | 4/2020 | Li et al. |
| 2020/0226586 A1 | 7/2020 | Lu et al. |
| 2020/0410097 A1 | 12/2020 | Miller |
| 2021/0056066 A1* | 2/2021 | Vijayrao ............... G06F 13/385 |

FOREIGN PATENT DOCUMENTS

| | | |
|---|---|---|
| CN | 101344904 | 9/2010 |
| CN | 101997834 B | 3/2011 |
| CN | 102438013 | 5/2012 |
| CN | 104778141 A | 7/2015 |
| CN | 106230584 A | 12/2016 |
| CN | CN106372487 | 2/2017 |
| CN | 103856478 | 11/2017 |
| CN | 108243009 A | 7/2018 |
| CN | 110795774 | 8/2018 |
| CN | 201810871817.4 A | 8/2018 |
| CN | 109614799 A | 4/2019 |
| CN | 106027235 | 5/2019 |
| CN | 109784070 A | 5/2019 |
| CN | 108234115 | 3/2021 |
| CN | 108011716 | 4/2021 |
| JP | 2005275467 A | 10/2005 |
| WO | WO2016160597 | 10/2016 |
| WO | WO2019098573 | 5/2019 |

OTHER PUBLICATIONS

GB, "Information security technology—Trusted computing specification—Motherboard Funcation adn interfae of trusted Platform", Nov. 12, 2013, 414 pages.
Haung et al., "The TPCM 3P3C Defense Architecture of Safety and Trusted Platform," retrieved on Jun. 28, 2019 at http://www.wuj.whu.edu.cn/d/file/allhtml/lx/lx1802/337159b2-52a0-4cb0-a373-26f5bebd3834.htm, vol. 64 No. 2, Apr. 2019 (6 pages).
Intel QAT powers Nginx compression processing—Linux high, retrieved on Jul. 3, 2019 at https://syswift.com/407.html, 21 pages.
PCT Search Report and Written Opinion dated Jul. 30, 2019 for PCT Application No. PCT/US19/28989, 7 pages.
mamicode.com, "Trusted Execution Technology—Basic Principles," retrieved on Jun. 28, 2019 from http://www.mamicode.com/info-detail-2182008.html, time stamped Feb. 4, 2018 (8 pages).

Office Action for U.S. Appl. No. 16/529,524, dated Apr. 2, 2021, Fu, "Measurement Processing of High-Speed Cryptographic Operation ", 30 Pages.
Office Action for U.S. Appl. No. 16/393,870, dated Apr. 5, 2021, Fu, "Encryption Card, Electronic Device, and Encryption Service Method", 10 Pages.
Office Action for U.S. Appl. No. 16/460,907, dated May 11, 2021, Fu, "Methods and Systems for Activating Measurement Based On a Trusted Card", 22 Pages.
Office Action for U.S. Appl. No. 16/538,008, dated Jun. 8, 2021, Fu, "Key Processing Methods and Apparatuses, Storage Media, and Processors", 21 Pages.
Office Action for U.S. Appl. No. 16/554,383, dated Jun. 24, 2021, "Cryptographic Operation Processing Method, Apparatus, and System, and Method for Building Measurement for Trust Chain", 78 Pages.
Office Action for U.S. Appl. No. 16/554,241, dated Jul. 14, 2021, Fu, "Cryptographic Operation Processing Methods, Apparatuses, and Systems", 23 Pages.
Office Action for U.S. Appl. No. 16/393,870, dated Jul. 27, 2021, Fu, "Encryption Card, Electronic Device, and Encryption Service Method", 11 Pages.
Office Action for U.S. Appl. No. 16/457,650, dated Aug. 9, 2021, Fu, "Key and Certificate Distribution Method, Identity Information Processing Method, Device, and Medium", 8 Pages.
Office Action for U.S. Appl. No. 16/586,463, dated Aug. 16, 2021, Fu, "Data Processing Method, Device and System", 19 Pages.
Office Action for U.S. Appl. No. 16/460,907, dated Sep. 21, 2021, Fu, "Methods and Systems for Activating Measurement Based On a Trusted Card", 25 Pages.
Office Action for U.S. Appl. No. 16/554,383, dated Oct. 13, 2021, Fu, "Cryptographic Operation Processing Method, Apparatus, and System, and Method for Building Measurement for Trust Chain", 76 pgs.
Trusted Platform Module 2.0, Oct. 2017, Microsoft Corporation, 2017, 3 pgs.
Office Action for U.S. Appl. No. 16/554,241, dated Nov. 15, 2021, Fu, "Cryptographic Operation Processing Methods, Apparatuses, and Systems", 24 Pages.
Zhang, et al., "A New Approach of TPM Construction Based on J2810", Wuhan University Journal of Natural Sciences, vol. 12, No. 1, https://doi.org/10.1007/s11859-006-0146-6, 2007, 4 pgs.
English Translation of CN Office Action dated Jan. 6, 2022 for CN Patent Application No. 201810996079.6, 39 pages.
Extended European Search Report dated Dec. 13, 2021 for European Patent Application No. 19793424.3, 8 pages.
Office Action for U.S. Appl. No. 16/586,463, dated Feb. 4, 2022, Fu, "Data Processing Method, Device and System", 23 Pages.
English Translation of CN Office Action dated Mar. 3, 2022 for CN Patent Application No. 201811143031.7, 7 pages.
English Translation of CN Office Action dated Dec. 28, 2021 for CN Patent Application No. 201810707787.3, 4 pages.

* cited by examiner

MEASUREMENT METHODS, DEVICES AND SYSTEMS BASED ON TRUSTED HIGH-SPEED ENCRYPTION CARD

CROSS REFERENCE TO RELATED PATENT APPLICATIONS

This application claims priority to Chinese Patent Application No. 201810871817.4, filed on 2 Aug. 2018 and entitled "Measurement Methods, Devices and Systems Based on Trusted High-Speed Encryption Card," which is hereby incorporated by reference in its entirety.

TECHNICAL FIELD

The present disclosure relates to the field of trusted computing, and particularly, to measurement methods, devices, and systems based on a trusted high-speed encryption card.

BACKGROUND

Measurements are a technical means to protect the integrity of a platform and a system. At certain specific moments, a measurement is performed for a target to obtain certain information about the target (such as a hash value of a file), and values of these pieces of information are compared with standard values that are previously recorded, thereby determining whether the integrity of the target is compromised.

Currently, two types of trusted computing exists: two technical routes, namely, a Trusted Platform Control Module (TPCM) and a Trusted Platform Module (TPM) of the International TCG (Trusted Computing Group), and corresponding chain of trust construction methods are as follows.

For a TPM-based chain of trust construction, core elements of trusted computing are a chain of trust and a trusted root. A Trusted Platform Module (TPM) in the TCG specification is a hardware trusted root of a trusted computing platform, and TPM is a security chip that provides protected secure storage and cryptographic computing capabilities. The TPM is physically connected to a computing platform, and connected to a CPU via an external bus, e.g., directly solidified on a motherboard and connected via an LPC bus (which a full name as Low Pin count) on a PC platform. A definition of "trusted" given in the TCG specification is an entity always running for a specific target in a predictable way. A core mechanism of trusted computing is to build a trusted computing environment through a chain of trust mechanism. Whether a running entity is trusted or not is based on the credibility of a previous operating process of a system. Based on this type of trusted relationship, if the system starts from an initial trusted root, this type of trust can be maintained by passing on in every conversion of a platform computing environment, thereby establishing a chain of trust of a level verifying a level and a level trusting a level on a computing platform. Such computing environment is always trustable, and can be trusted by local users or remote entities, as shown in FIG. 1. Key technologies for trusted computing include several parts: a trusted measurement (as shown by a solid line in FIG. 1), a trusted report (as shown by a dotted line in FIG. 1), a trusted storage (as shown by a dashed line in FIG. 1), and a trusted network connection (as shown by a two-dot chain line in FIG. 1), etc.

For a construction of a TPCM-based chain of trust, basic functions of a Trusted Platform Module are implemented by a Trusted Platform Control Module (TPCM), and its functional composition is basically the same as that of the TPM. However, since a core measurement root CRTM of the TPM (with a full name as Core Root of Trust for Measurement) is located in BIOS (with a full name as Basic Input/Output System), and is not protected by the TPM, the TPCM therefore proposes a new trusted measurement root design, which solves a problem associated with a starting measurement point of a trusted measurement root, and changes orders of starting and measurement. Based thereon, a process of chain of trust measurement using such chip as a trusted root is established. This enables the chip to control startup of a whole system, I/O interface control and system configuration, etc., and embodies a control effect of the chip for the credibility of the system. During a process of operational control transfer of a computing platform, a trusted root TPCM determines whether the authenticity and integrity of a next-level execution code have been tampered with. If not, a system passes an operational control privilege to the next-level trusted execution code. The scope of credibility of the system is extended to the next level of functional code. Similarly, this type of system control privilege is continuously passed on. A process of establishing and transmitting a chain of trust can thus be implemented, and a system-wide trusted construction is finally realized. A complete delivery process of system trust begins with a trusted root, and an order of system control privilege is passed from a trusted platform control module to a trusted BIOS and then to a trusted operating system loader, from the trusted operating system loader to a trusted operating system, and then from a trusted operating system to a trusted application.

For an IMA (with a full name as Internal Measurement Approach) measurement method, at the moment when an operating system loads a program into a memory for measuring a program file, a measurement result is processed by a trusted computing chip TPM. In this way, a chain of trust from the TPM hardware integrity measurement system application program is completed.

In a process of integrity measurement of a platform and a system, when a cryptographic algorithm of a trusted high-speed encryption card is dynamically loaded, traditional TPM and TPCM cannot guarantee active measurements of the platform and the system, and static and dynamic loading measurements of firmware related to high-speed cryptographic operations at the same time during a device startup.

In a process of performing an integrity measurement by a trusted security chip in existing technologies, no effective solution has yet been proposed for a problem of failing to guarantee active measurements of a platform and a system, and static and dynamic loading measurements of firmware related to high-speed cryptographic operations at the same time during a device startup.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a measurement method, device, and system based on a trusted high-speed encryption card, so as to at least solve the technical problem of failing to guarantee active measurements of a platform and a system, and static and dynamic loading measurements of firmware related to high-speed cryptographic operations at the same time during a device startup in a process of performing an integrity measurement by a trusted security chip in the existing technologies.

According to an aspect of the embodiments of the present disclosure, a measurement method based on a trusted high-speed encryption card is provided, which includes:

a BIOS actively measuring at least one firmware in a device if an integrity measurement result made by a trusted security chip for the BIOS indicates that the integrity thereof is not corrupted;

loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

According to another aspect of the embodiments of the present disclosure, a measurement method based on a trusted high-speed encryption card is further provided, which includes:

a BIOS actively measuring the integrity of an option memory firmware of a trusted high-speed encryption card in a device when an integrity measurement result made by a trusted security chip indicates that the integrity of the BIOS is not corrupted; and triggering the option memory firmware of the trusted high-speed encryption card to measure the integrity of one or more firmware in the device if the integrity of the option memory firmware of the trusted high-speed encryption card that is actively measured by the BIOS is not corrupted, wherein the one or more firmware are loaded when the integrity of the one or more firmware is not corrupted, or otherwise a system of the device is forbidden from being started or the system is controlled to enter into a non-secure mode.

According to another aspect of the embodiments of the present disclosure, a measurement device based on a trusted high-speed encryption card is also provided, which includes:

a trusted security chip configured to measure the integrity of a BIOS; and the BIOS configured to actively measure at least one firmware in a device if an integrity measurement result made by a trusted security chip for the BIOS indicates that the integrity thereof is not corrupted, load one or more firmware if the integrity of the one or more firmware in the device actively measured by the BIOS is not corrupted, and forbid a system of the device from being started or control the system to enter into a non-secure mode if the integrity of the one or more firmware in the device actively measured by the BIOS is corrupted.

According to another aspect of the embodiments of the present disclosure, a measurement device based on a trusted high-speed encryption card is also provided, which includes:

a trusted security chip configured to measure the integrity of a BIOS;

the BIOS configured to actively measure the integrity of option memory firmware of the trusted high-speed encryption card in a device when an integrity measurement result made by the trusted security chip for the BIOS indicates that the integrity thereof is not corrupted; and the option memory firmware configured to measure one or more firmware in the device when the integrity of the option memory firmware of the trusted high-speed encryption card is not corrupted, wherein the one or more firmware are loaded when the integrity of the one or more firmware is not corrupted, or otherwise a system of the device is forbidden from being started or the system is controlled to enter into a non-secure mode.

According to another aspect of the embodiments of the present disclosure, a storage media is further provided, the storage media including a stored program, wherein the program, when running, controls a device in which the storage media is located to perform the following steps:

a BIOS actively measuring at least one firmware in a device if an integrity measurement result made by a trusted security chip for the BIOS indicates that the integrity thereof is not corrupted;

loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

According to another aspect of the embodiments of the present disclosure, a processor is also provided, and the processor is configured to run a program, wherein the program performs the following steps when running:

a BIOS actively measuring at least one firmware in a device if an integrity measurement result made by a trusted security chip for the BIOS indicates that the integrity thereof is not corrupted;

loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

According to another aspect of the embodiments of the present disclosure, a measurement system based on a trusted high-speed encryption card is also provided, which includes:

a trusted security chip configured to perform an integrity measurement on a BIOS, the BIOS actively measuring at least one firmware in a device when a result of the integrity measurement indicates that the integrity thereof is not corrupted; and a processor connected to the trusted security chip and configured to complete a measurement of a cryptographic operational firmware based on a measurement key provided by the trusted security chip, wherein one or more firmware are loaded when the integrity of the one or more firmware in the device actively measured by the BIOS is not corrupted, and a system of the device is prohibited from booting or the system is controlled to enter into a non-secure mode if the integrity of the one or more firmware actively measured by the BIOS is corrupted.

According to another aspect of the embodiments of the present disclosure, a measurement system based on a trusted high-speed encryption card is further provided, which includes:

a trusted security chip configured to perform an integrity measurement on a BIOS, the BIOS actively measuring the integrity of an option memory firmware of the trusted high-speed encryption card in a device when a result of the integrity measurement indicates that the integrity thereof is not corrupted;

the option memory firmware of the trusted high-speed encryption card configured to trigger to measure the device to measure the integrity of one or more firmware when the integrity thereof is not corrupted; and a processor coupled to the trusted security chip and configured to complete a measurement of a cryptographic operational firmware based on a measurement key provided by the trusted security chip, wherein the one or more firmware are loaded if the integrity of the one or more firmware is not corrupted, or otherwise a system of the device is forbidden from being started or the system is controlled to enter into a non-secure mode.

According to another aspect of the embodiments of the present disclosure, a measurement method for a trusted high-speed encryption card is further provided, which includes:

measuring the integrity of a BIOS in a device to obtain a first measurement result, wherein the integrity is used for determining whether the BIOS is tampered with;

determining that the first measurement result satisfies a first preset condition;

obtaining a second measurement result, wherein the second measurement result is obtained based on at least one firmware in the device measured by the BIOS;

determining the second measurement result satisfies a second preset condition; and loading one or more firmware.

In the embodiments of the present disclosure, if an integrity measurement result performed by a trusted security chip for a BIOS indicates that the integrity thereof is not corrupted, the BIOS can actively measure at least one firmware in a device. If the integrity of one or more firmware in the device actively measured by the BIOS is not corrupted, the one or more firmware can be loaded. If the integrity of the one or more firmware in the device actively measured by the BIOS is corrupted, a system of the device is prohibited from being started up, or the system is controlled to enter into a non-secure mode.

It is easy to note that a BIOS can actively measure at least one firmware in a device when an integrity measurement result performed on the BIOS by a trusted security chip indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solutions provided by the embodiments of the present disclosure solve the technical problems of failing to guarantee active measurements of a platform and a system, and loading measurements of cryptographic operations at the same time during a device startup in a process of performing an integrity measurement by a trusted security chip in the existing technologies.

BRIEF DESCRIPTION OF THE DRAWINGS

The accompanying drawings described herein are intended to enable a further understanding of the present disclosure, and constitute to be a part of the present disclosure. Exemplary embodiments of the present disclosure and the description thereof are intended to describe the present disclosure, and are not intended to be construed as limitations on the present disclosure. In the drawings.

DETAILED DESCRIPTION

Figure 1:
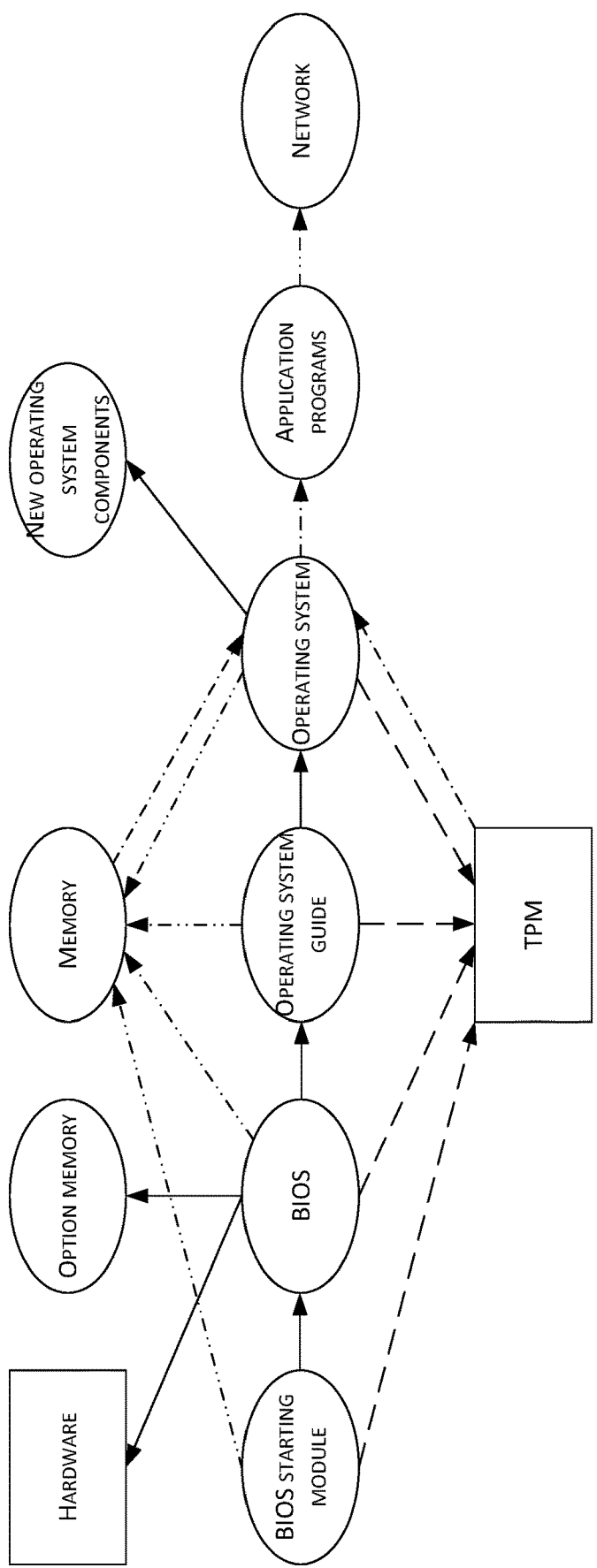
FIG. 1 is a schematic diagram of a TCG chain of trust according to the existing technologies.

In order to enable one skilled in the art to understand technical solutions in the exemplary embodiments of the present disclosure in a better manner, the technical solutions in the exemplary embodiments of the present disclosure are clearly and completely described hereinafter with reference to the accompanying drawings in the exemplary embodiments of the present disclosure. Apparently, the described embodiments represent merely a part and not all of the embodiments of the present disclosure. All other embodiments obtained by one of ordinary skill in the art based on the embodiments of the present disclosure without making any creative effort shall fall within the scope of protection of the present disclosure.

It should be noted that terms "first", "second" and the like in the specification and claims of the present disclosure and the accompanying drawings are used to distinguish similar objects, and are not necessarily used to describe a specific order or sequence. It should be understood that data so used may be interchanged whenever appropriate, so that the embodiments of the present disclosure described herein can be implemented in a sequence other than those illustrated or described herein. In addition, terms "including", "containing", and variations thereof are intended to cover a non-exclusive inclusion, for example, a process, method, system, product, or device that includes a series of steps or units is not necessarily limited to those steps or units that are explicitly listed, but may also include other steps or units that are not explicitly listed or that are inherent to such process, method, product, or device.

First, some nouns or terms that appear when the embodiments of the present disclosure are described are applicable to the following explanations:

Trusted Computing: Trusted Computing can be widely used in computing and communication systems, and is based on a trusted computing platform supported by hardware security module(s) to improve overall system security.

Trusted Platform Module (TPM/TPCM) can be a security chip that provides integrity and authenticity guarantees for evidence, and is typically physically bound to a computing platform.

Trusted Measurement: A practical method of trusted measurement is an integrity measurement. The integrity measurement can be to compare a hash value of a code calculated by a hash function with a stored hash value, to find out whether the code changes, and have a system to make a corresponding judgment according to a comparison result.

Trusted Static Measurement: Participate in establishing a chain of trust during a startup of a system, and evaluate the chain of trust no more after the startup of the system is completed, and during running of the system.

Trusted Dynamic Measurement: A trusted measurement can be dynamically performed on a measurement target in response to receiving any trusted measurement request.

FPGA (with a full name as Field-Programmable Gate Array) can be a high-performance, low-power programmable logic device, and is not a traditional Von Neumann structure. It directly generates circuits for computations of an algorithm. A targeted design can be made based on an algorithm and algorithm indicators, which has a very high execution and computational efficiency, and is ideal for online identification systems that focus on execution efficiency. An ASIC chip is a dedicated chip having the highest computational performance and efficiency, but a development cycle thereof is long and the research and development cost is high. It is difficult to adapt to the field of deep learning algorithms that are currently being rapidly developed.

Trusted high-speed data encryption card (THSDEC): A high-speed data encryption card having trusted functions.

First Embodiment

According to the embodiments of the present disclosure, an embodiment of a measurement method based on a trusted high-speed encryption card is provided. It should be noted that steps shown in a flowchart of the accompanying drawings may be executed in a computer system such as a set of computer executable instructions. Furthermore, although a logical order is shown in a flowchart, in some cases, steps shown or described may be performed in a different order than the one described therein.

Figure 2:
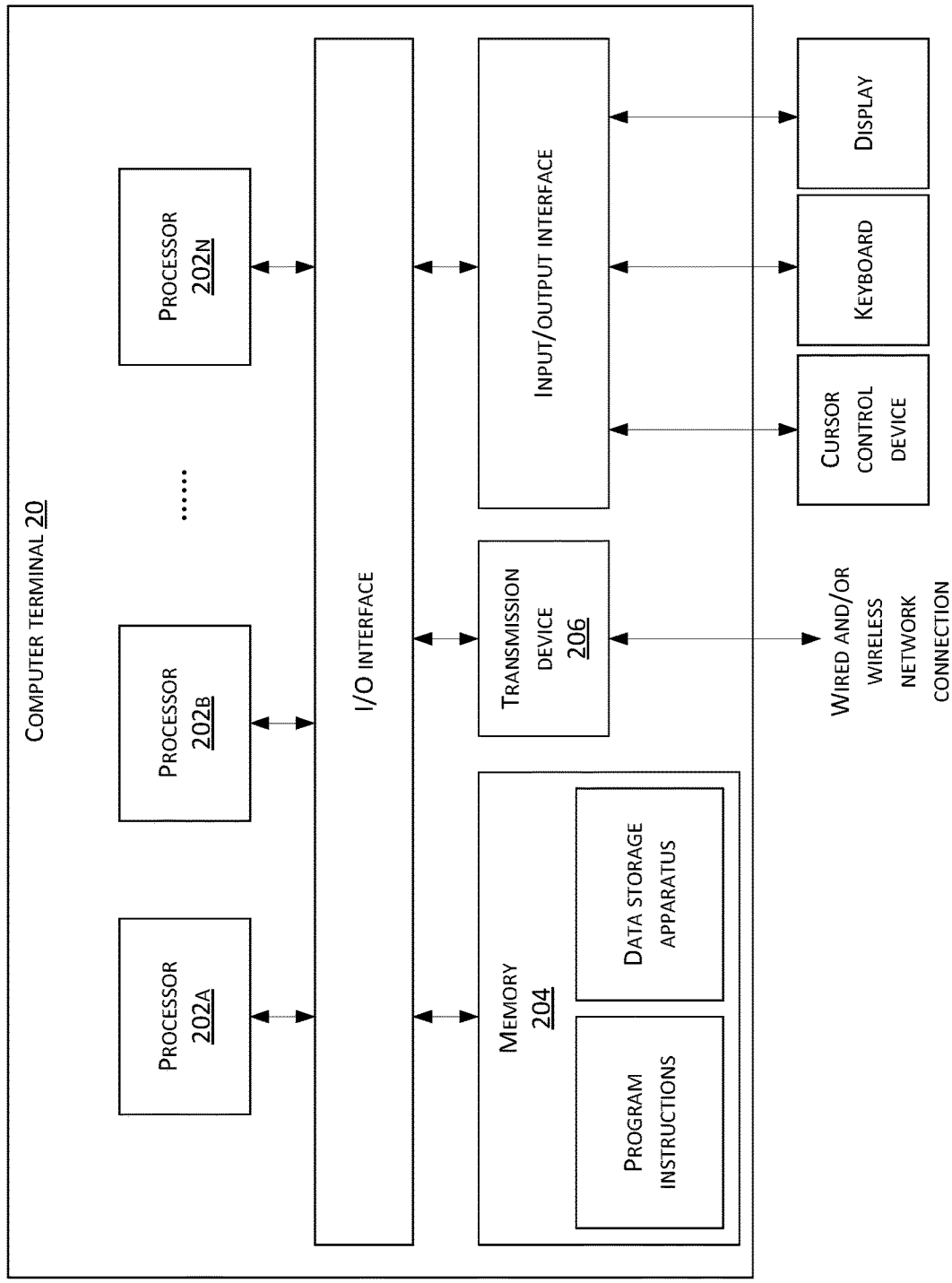
FIG. 2 is a block diagram showing a hardware structure of a computer terminal for implementing a measurement method based on a trusted high-speed encryption card according to an embodiment of the present disclosure.

The method embodiment provided in the first embodiment of the present disclosure can be performed in a mobile terminal, a computer terminal, etc. FIG. 2 is a block diagram showing a hardware structure of a computer terminal (or a mobile device) for implementing a measurement method based on a trusted high-speed encryption card. As shown in FIG. 2, the computer terminal 20 (or the mobile device 20) may include one or more (202a, 202b, ..., 202n as shown in the figure) processors 202 (the processor 202 may include, but is not limited to, a processing device such as a microprocessor MCU or a programmable logic device FPGA), a memory 204 used for storing data, and a transmission device 206 used for communication functions. In addition, the computer terminal 20 (or the mobile device 20) may also include a display, an input/output interface (I/O interface), a universal serial bus (USB) port (which may be included as one of the ports of the I/O interface), a network interface, a power supply, and/or a camera. One skilled in the art can understand that the structure shown in FIG. 2 is merely illustrative, and does not limit the structure of the above electronic device. For example, the computer terminal 20 may also include more or fewer components than those shown in FIG. 2, or may have a configuration different from that shown in FIG. 2.

It should be noted that one or more of the processors 202 and/or other data processing circuits may generally be referred to as "data processing circuits" herein. The data processing circuit may be embodied in whole or in part as software, hardware, firmware or any other combination. Moreover, the data processing circuit can be a single and separate processing module, or incorporated in whole or in part into any of the other components in the computer terminal 20 (or the mobile device). As involved in the embodiments of the present disclosure, the data processing circuit is used as a processor control (e.g., selection of a variable resistance terminal path connected to the interface).

The memory 204 can be used to store software programs and modules of application software, such as program instructions/data storage devices corresponding to the measurement method based on the trusted high-speed encryption card in the embodiments of the present disclosure. The processor 202 performs various functional applications and data processing by running software program(s) and module(s) stored in the memory 204, i.e., to implement the measurement method based on a trusted high-speed encryption card as described above. The memory 204 can include high-speed random access memory, or can include a non-volatile memory, such as one or more magnetic storage devices, a flash memory, or other non-volatile solid state memory. In some examples, the memory 204 can further include storage devices remotely located relative to the processor(s) 202. These storage devices can be connected to the computer terminal 20 over a network. Examples of such network include, but are not limited to, the Internet, an intranet, a local area network, a mobile communication network, and a combination thereof.

The memory 204 may include a form of processor-readable media such as a volatile memory, a random access memory (RAM) and/or a non-volatile memory, for example, a read-only memory (ROM) or a flash RAM. The memory 204 is an example of a processor-readable media.

The processor-readable media may include a volatile or non-volatile type, a removable or non-removable media, which may achieve storage of information using any method or technology. The information may include a processor-readable instruction, a data structure, a program module or other data. Examples of processor-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media does not include transitory media, such as modulated data signals and carrier waves.

The transmission device 206 is used for receiving or transmitting data via a network. Specific examples of the network may include a wireless network provided by a communication provider of the computer terminal 20. In an example, the transmission device 206 includes a Network Interface Controller (NIC) that can be connected to other network devices through a base station to conduct communications with the Internet. In an example, the transmission device 206 can be a Radio Frequency (RF) module used for conducting communications with the Internet wirelessly.

The display can be, for example, a touch screen liquid crystal display (LCD). The touch screen liquid crystal display enables a user to interact with a user interface of the computer terminal 20 (or the mobile device).

It should be noted that, in some optional embodiments, the computer device (or the mobile device) shown in FIG. 2 may include hardware components (including circuits), software components (including computer codes stored in computer readable media), or a combination of both hardware and software components. It should be noted that FIG. 2 is only an example of a specific embodiment, and is intended to show types of components that may be present in the aforementioned computer device (or the mobile device).

Optionally, the trusted high-speed encryption card in the present disclosure may be formed by a trusted TPM/TPCM module and a reconfigurable high-speed cryptographic operational module such as an FPGA. The trusted module can ensure the integrity of a platform and a system through low-speed operations, and guarantee the integrity of high-speed cryptographic dynamic loading and dynamic operation-related firmware. The high-speed cryptographic operational module completes secure high-speed cryptographic operations under an assurance of the integrity of the trusted module.

From measurement time points, measurements can include a static measurement and a dynamic measurement. A static measurement is involved in establishing a chain of trust during a startup of a system, and the chain of trust is no longer evaluated after the startup of the system is completed or during running of the system. A dynamic measurement can refer to a dynamic trusted measurement of a measurement target when any trusted measurement request is received.

From measured objects, measurements may include a platform system measurement and a cryptographic operation measurement. A platform system measurement may refer to security measurements related to a platform and a system when or after a device is started. Such measurements are completed by a trusted module. A cryptographic operation measurement may be referred to as a measurement related to a user cryptographic operation, which is cooperatively performed by a trusted module and a FPGA high-speed cryptographic algorithm.

Figure 3:
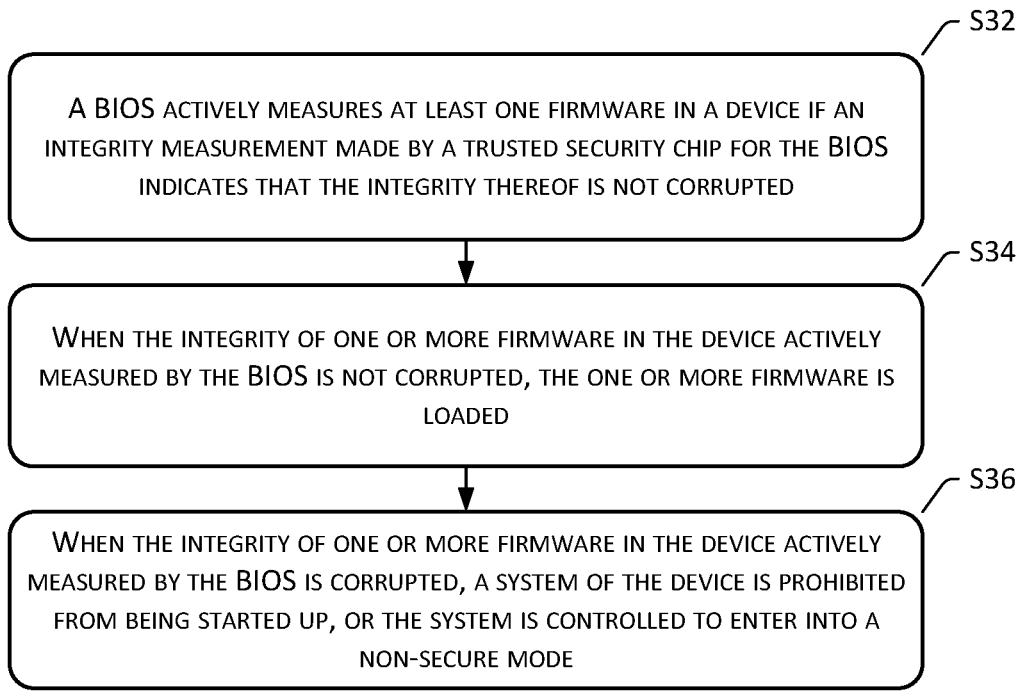
FIG. 3 is a flowchart of a measurement method based on a trusted high-speed encryption card according to the first embodiment of the present disclosure.

In the above operating environment, the present disclosure provides a measurement method based on a trusted high-speed encryption card as shown in FIG. 3. FIG. 3 is a flowchart of a measurement method based on a trusted high-speed encryption card according to the first embodiment of the present disclosure. As shown in FIG. 3, the method may include the following steps.

Step S32: A BIOS actively measures at least one firmware in a device if an integrity measurement made by a trusted security chip for the BIOS indicates that the integrity thereof is not corrupted.

Specifically, the trusted security chip may be a trusted TPM/TPCM module in a trusted high-speed encryption card as described above, and may perform a measurement of the integrity of a BIOS of an OEM (with a full name as Original Equipment Manufacturer) server manufacturer.

Optionally, the firmware may include at least one of: a trusted high-speed cryptographic algorithmic firmware, a peripheral storage device, a memory, and a hardware device.

Figure 4:
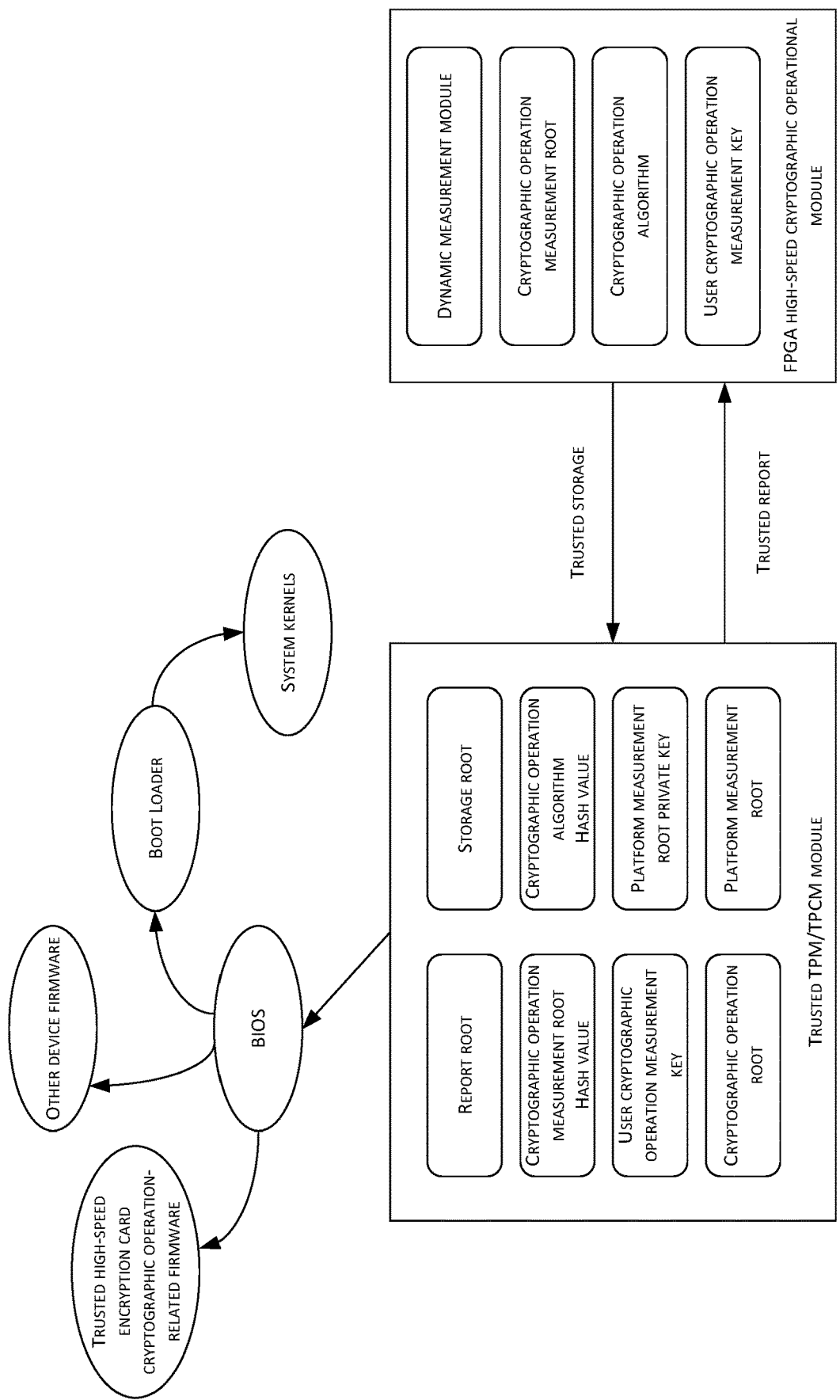
FIG. 4 is a structural diagram of an optional chain of trust construction based on a trusted high-speed encryption card according to an embodiment of the present disclosure.

Specifically, a building architecture of measurement of a chain of trust is proposed based on a trusted high-speed encryption card. FIG. 4 shows a building architecture of measurement of a chain of trust based on a BIOS extension, which can modify a BIOS of an OEM server manufacturer, to enable the BIOS to actively measure all ROM (with a full name as Read-Only Memory) of peripherals and firmware of other hardware.

As shown in FIG. 4, a building architecture of a measurement of a chain of trust based on a BIOS extension mainly shows a delivery of a static measurement of the chain of trust, and may specifically include an integrity measurement of the BIOS performed by a trusted TPM/TCM module, an integrity measurement of a cryptographic operational firmware and other device firmware(s) of the trusted high-speed encryption card performed by the BIOS, an integrity measurement of a Boot Loader performed by the BIOS, and an integrity measurement of system kernel(s) performed by the Boot Loader. Data interactions between a trusted TPM/TPCN module and a FPGA high-speed cryptographic operational module may include a trusted storage and a trusted report. The trusted storage may be to send sensitive information associated with high-speed cryptographic operation(s) such as a hash value of the high-speed cryptographic operational firmware, and a measurement root for the cryptographic operation(s), etc., from a FPGA high-speed cryptographic operational module to the trusted TPM/TPCM module for storing in a PCR (with a full name as Program Control Register) value of the trusted TPM/TPCM module to obtain protection from the trusted module. The trusted report may be the trusted TPM/TPCM module to perform a hash calculation on a measurement of firmware(s) associated with high-speed cryptographic operation(s), and after obtaining a hash comparison result, to report thereof to trusted firmware(s) of a FPGA high-speed cryptographic operational module that is/are associated with the high-speed cryptographic operation(s).

It should be noted that, in order to implement a measurement method based on a trusted high-speed encryption card, a trusted security chip manufacturer or a trusted security chip user can be assumed to have placed a public key PK (RPM) of a platform measurement root in a CPU white list mechanism of a device host, and stored a private key SK (RPM) in a trusted security chip, which can specifically be implemented using Intel SGX technology.

Step S34: When the integrity of one or more firmware in the device actively measured by the BIOS is not corrupted, the one or more firmware is loaded.

Step S36: When the integrity of one or more firmware in the device actively measured by the BIOS is corrupted, a system of the device is prohibited from being started up, or the system is controlled to enter into a non-secure mode.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, a firmware associated with a trusted high-speed cryptographic operation, such as the integrity of a cryptographic algorithm, can be actively measured by the BIOS, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup.

Figure 5:
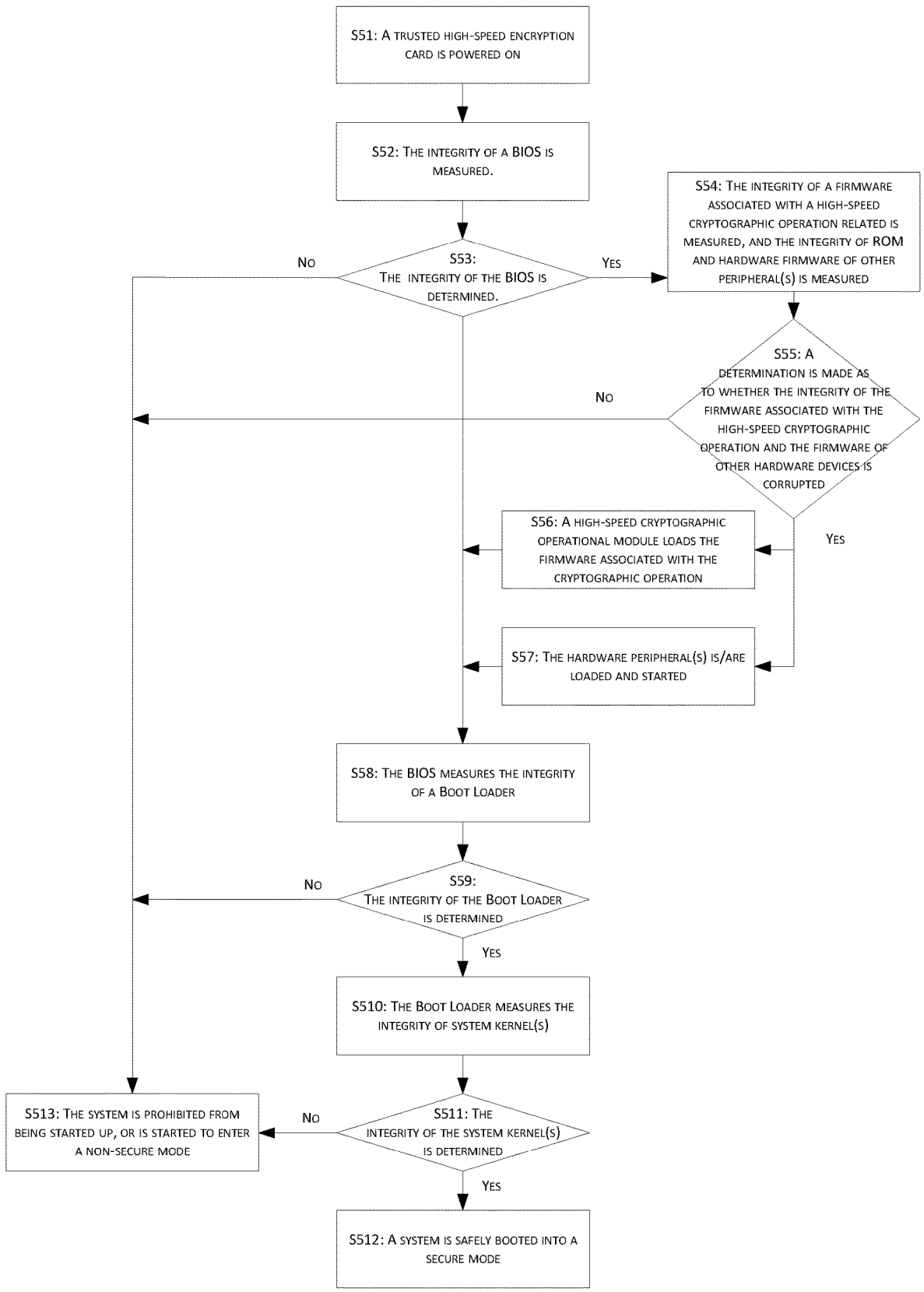
FIG. 5 is a flowchart of an optional measurement method based on a trusted high-speed encryption card according to an embodiment of the present disclosure.

For example, for the building architecture of the chain of trust as shown in FIG. 4, a static measurement starting method of a corresponding trusted high-speed encryption card is shown in FIG. 5. Such method may include the following steps.

Step S51: A trusted high-speed encryption card is powered on.

Step S52: The integrity of a BIOS is measured.

Optionally, a measurement of the integrity of the BIOS can be completed using a platform measurement root of the trusted high-speed encryption card and public and private keys of platform measurement root keys.

Step S53: The integrity of the BIOS is determined.

Optionally, if the integrity of the BIOS is not corrupted, step S54 and step S58 can be performed. Otherwise step S513 is performed.

Step S54: The integrity of a firmware associated with a high-speed cryptographic operation related is measured, and the integrity of ROM and hardware firmware of other peripheral(s) is measured.

Optionally, the BIOS can proactively measure the integrity of a firmware associated with a trusted high-speed cryptographic operation, as well as the integrity of a ROM of a hardware peripheral and its firmware.

Step S55: A determination is made as to whether the integrity of the firmware associated with the high-speed cryptographic operation and the firmware of other hardware devices is corrupted.

Optionally, if no corruption exists, step S56 and step S57 may be performed. Otherwise step S513 is performed.

Step S56: A high-speed cryptographic operational module loads the firmware associated with the cryptographic operation.

Optionally, in response to determining that the integrity of the firmware associated with the high-speed cryptographic operation is not corrupted, the firmware associated with the high-speed cryptographic operation is loaded, and step S58 is performed.

Step S57: The hardware peripheral(s) is/are loaded and started.

Optionally, in response to determining that the firmware integrity of the other hardware devices is not corrupted, the firmware boot peripherals of the other hardware devices are loaded, and step S58 is performed.

Step S58: The BIOS measures the integrity of a Boot Loader.

Step S59: The integrity of the Boot Loader is determined.

Optionally, if the integrity of the Boot Loader is not corrupted, step S510 may be performed. Otherwise step S513 is performed.

Step S510: The Boot Loader measures the integrity of system kernel(s).

Step S511: The integrity of the system kernel(s) is determined.

Optionally, if the integrity of the system kernel(s) is not corrupted, step S512 may be performed. Otherwise step S513 is performed.

Step S512: A system is safely booted into a secure mode.

Optionally, after the trusted high-speed encryption card is started, the integrity of the BIOS, the integrity of the firmware associated with the high-speed cryptographic operation and the firmware of the other hardware devices, the integrity of the Boot Loader, and the integrity of the system kernel(s) can be sequentially measured. The device can be determined to be trustable only after determining that the integrity of all these measured objects is not corrupted, so that the system can be controlled to be safely booted and enter the secure mode.

Step S513: The system is prohibited from being started up, or is started to enter a non-secure mode.

Optionally, after the trusted high-speed encryption card is started, the integrity of the BIOS, the integrity of the firmware associated with the high-speed cryptographic operation and the firmware of the other hardware devices, the integrity of the Boot Loader, and the integrity of the system kernel(s) can be sequentially measured. The device is determined to be not trustable as long as the integrity of any one of the measured objects is determined to be corrupted. Therefore, the system can be controlled to be prohibited from being started up, or the system can be control to be started and entered into a non-secure mode.

In the method provided by the foregoing first embodiment of the present disclosure, when an integrity measurement of a BIOS performed by a trusted security chip indicates that the integrity of the BIOS is not corrupted, the BIOS may actively measure at least one firmware in a device. When the integrity of one or more firmware in the device measured by the BIOS is not corrupted, the one or more firmware may be loaded. When the integrity of one or more firmware in the device measured by the BIOS is corrupted, a system of the device may be forbidden from being started up, or the system may be controlled to enter into a non-secure mode.

It is easy to note that a BIOS can actively measure at least one firmware in a device when an integrity measurement result performed by a trusted security chip for the BIOS indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solution of the foregoing first embodiment provided by the present disclosure solves the technical problems of failing to guarantee active measurements of a platform and a system, and loading measurements of cryptographic operations at the same time during a device startup in a process of performing an integrity measurement for a trusted security chip in the existing technologies.

In the foregoing embodiments of the present disclosure, before the BIOS actively measures at least one firmware in the device at step S32, the method may further include the following steps.

Step S38: A trusted high-speed encryption card is powered on and started.

Step S310: A platform measurement root of the trusted high-speed encryption card is obtained.

Specifically, the platform measurement root may include measurement code(s) for performing integrity measurement(s) on the device. The platform measurement root may be loaded into a memory space of the device when the device is started at the first time, and loaded from the memory to the CPU of the device. It should be noted that, in order to ensure the accuracy of the platform measurement root that is obtained, the trusted high-speed encryption card can encrypt the platform measurement root to obtain a trusted measurement root, load the trusted measurement root into the memory of the motherboard, and then load the trusted measurement root is loaded from the memory into the CPU.

Step S312: A trusted security chip uses the platform measurement root and a key to perform an integrity measurement for the BIOS.

Optionally, a host processor stores a public key of a key pair, and the public key and a private key that encrypts the measurement root together form a pair of asymmetrical measurement keys.

In an optional solution, the host processor decrypts the trusted measurement root using the public key to obtain a measurement root. The measurement root includes a measurement code. The measurement code is executed to obtain a measurement result of the BIOS. The measurement result is then encrypted using the public key to obtain a processing result. The host processor sends the obtained processing result to the security chip. The security chip decrypts the encrypted measurement result using the private key (i.e., the private key that encrypts the measurement root), and the measurement result can thereby be obtained. When the system is started for the first time, the measurement result can be hashed to obtain a hash value, which is stored in a PCR of the trusted chip as a measurement reference value. When the system is started again, a hash value of a measurement result is compared with the measurement reference value. If the hash value of the measurement result is the same as the measurement reference value, a determination is made that the BIOS is complete, i.e., the integrity of the BIOS is not corrupted. If the hash value of the measurement result is different from the measurement reference value, a determination is made that the BIOS is incomplete, i.e., the integrity of the BIOS is corrupted, and so a platform and a system are considered to have destructive attacks.

It should be noted that the integrity of at least one firmware in a device can also be measured using the above method.

In the above embodiments of the present disclosure, when an integrity measurement of the BIOS indicates that the integrity is corrupted, the system of the device is forbidden from booting, or the system is controlled to enter into a non-secure mode.

In an optional solution, the integrity of a BIOS is measured during a startup of a device. If the integrity of the BIOS is compromised, a determination can be made that the BIOS is incomplete and the device is not trustable. A system of the device is forbidden from booting, or the system is controlled to enter into a non-secure mode, to ensure the security of the startup of the device.

In the above embodiments of the present disclosure, after loading one or more firmware at step S34, the method may further include the following steps.

Step S314: The BIOS measures the integrity of a Boot Loader.

Specifically, the Boot Loader can be a program that runs before a system kernel or an application program runs. Using such program, a hardware device can be initiated, and a map of a memory space can be established, thereby bringing a hardware and software environment of the system to a suitable state, in order to prepare a correct environment for involving system kernels at the end.

In an alternative solution, the integrity of the Boot Loader can be measured using the method that measures the integrity of the BIOS as described above.

Step S316: The Boot Loader is triggered to measure the integrity of a system kernel of the device when the integrity of the Boot Loader measured by the BIOS is not corrupted.

In an alternative solution, the integrity of the system kernel can be measured using the method that measures the integrity of the BIOS as described above.

Step S318: When the integrity of the Boot Loader measured by the BIOS is corrupted, the system of the device is prohibited from booting, or the system is controlled to enter into a non-secure mode.

In an optional solution, during the startup of the device, after the firmware associated with the trusted high-speed cryptographic operation is loaded or the firmware booting peripherals of the other hardware devices is loaded, the integrity of the Boot Loader can be measured by the BIOS. If the integrity of the Boot Loader is not corrupted, the Boot Loader can be determined to be complete, and thereby the Boot Loader is executed. The integrity of the system kernel(s) of the device is measured by the Boot Loader. In response to determining that the integrity of the Boot Loader is corrupted, the Boot Loader can be determined to be incomplete, and the device is not trustable. Thus, the system of the device can be forbidden from being started, or the system is controlled to enter a non-secure mode, to ensure the security of the startup of the device.

It should be noted that the firmware associated with the trusted high-speed cryptographic operation and the integrity of the ROM of the hardware peripherals and the firmware thereof can be actively measured by the BIOS, when the BIOS is determined to be complete and the device is trusted. Furthermore, the integrity of the Boot Loader is measured by the BIOS.

In the foregoing embodiments of the present disclosure, after the Boot Loader is triggered to measure the system kernel of the device at step S316, the method may further include the following steps.

Step S320: A system of the device is securely started, and/or the system is controlled to enter into a secure mode when the integrity of the system kernel measured by the Boot Loader is not corrupted.

Step S322: When the integrity of the system kernel measured by the Boot Loader is corrupted, the system of the device is prohibited from being started, or the system is controlled to enter into a non-secure mode.

In an optional solution, the integrity of the system kernel of the device can be measured by the Boot Loader in response to determining that the integrity of the Boot Loader is not corrupted. If the integrity of the system kernel is determined to be not corrupted, the system kernel can be determined to be complete, and the device is trustable. The device can be controlled to start up the system safely, and control the system to enter a secure mode. If determining that the integrity of the system kernel is corrupted, the system kernel can be determined to be incomplete, and the device is not trustable. The system of the device can be prohibited from being started, or the system is started to enter into a non-secure mode, to ensure the security of the startup of the device.

It should be noted that the foregoing method embodiments are all expressed as a series of action combinations for the sake of description. One skilled in the art should understand that the present disclosure is not limited by the described sequences of actions, because certain steps may be performed in other sequences or concurrently in accordance with the present disclosure. Furthermore, one skilled in the art should also understand that the embodiments described in the specification all belong to exemplary embodiments, and actions and modules that are involved may not be necessarily required by the present disclosure.

Through the description of the above embodiments, one skilled in the art can clearly understand that the methods according to the foregoing embodiments can be implemented using software plus a necessary general hardware platform, and apparently can also be implemented by hardware. In many cases, the former is a better implementation. Based on such understanding, the essence of the technical solutions of the present disclosure or the parts that contribute to the existing technologies may be embodied in a form of a software product. Such computer software product is stored in a storage media (such as a ROM/RAM, a disk, an optical disk), and includes a number of instructions for causing a terminal device (which may be a mobile phone, a computer, a server, or a network device, etc.) to perform the methods described in various embodiments of the present disclosure.

Second Embodiment

According to the embodiments of the present disclosure, an embodiment of a measurement method based on a trusted high-speed encryption card is also provided. It should be noted that steps shown in a flowchart of the accompanying drawings may be executed in a computer such as a set of computer executable instructions. Furthermore, although a logical order is shown in the flowchart, in some cases, the steps may be performed in a different order than the ones shown or described therein.

Figure 6:
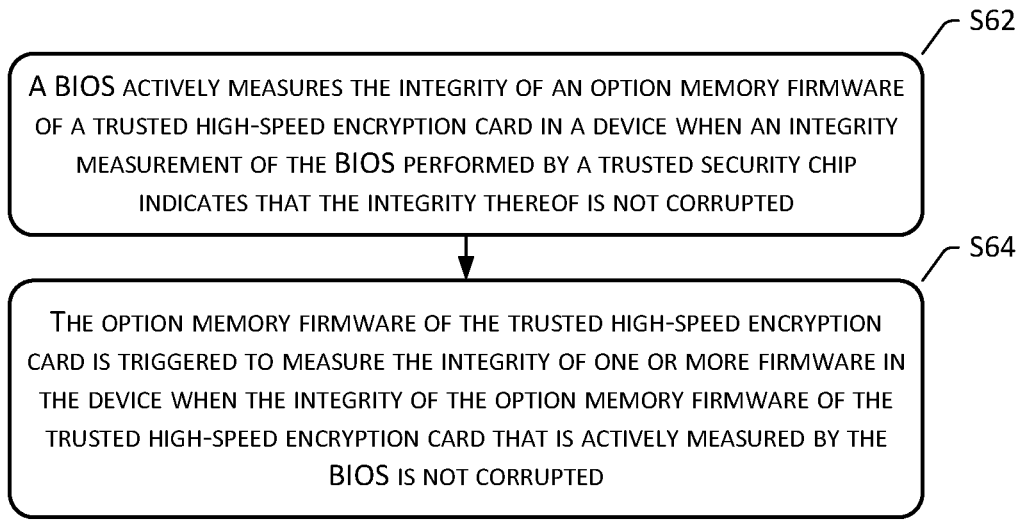
FIG. 6 is a flowchart of a measurement method based on a trusted high-speed encryption card according to the second embodiment of the present disclosure.

In the above operating environment, the present disclosure provides a measurement method based on a trusted high-speed encryption card as shown in FIG. 6.

Specifically, the trusted high-speed encryption card may be the same as the trusted high-speed encryption card in the first embodiment, and details thereof are not repeatedly described herein.

FIG. 6 is a flow chart of a measurement method based on a trusted high-speed encryption card according to the second embodiment of the present disclosure. As shown in FIG. 6, the method may include the following steps.

Step S62: A BIOS actively measures the integrity of an option memory firmware of a trusted high-speed encryption card in a device when an integrity measurement of the BIOS performed by a trusted security chip indicates that the integrity thereof is not corrupted.

Specifically, the trusted security chip may be a trusted TPM/TPCM module in the trusted high-speed encryption card. The integrity of a BIOS of an OEM (with a full name as Original Equipment Manufacturer) server manufacturer can be measured. The above option memory may be Oprom (Option ROM) of the trusted high-speed encryption card.

Step S64: The option memory firmware of the trusted high-speed encryption card is triggered to measure the integrity of one or more firmware in the device when the integrity of the option memory firmware of the trusted high-speed encryption card that is actively measured by the BIOS is not corrupted.

When the integrity of one or more firmware is not corrupted, the one or more firmware are loaded. Otherwise a system of the device is forbidden from being started, or the system is controlled to enter into a non-secure mode.

Optionally, the firmware may include at least one of: a trusted high-speed cryptographic algorithmic firmware, a peripheral storage device, a memory, and a hardware device.

Figure 7:
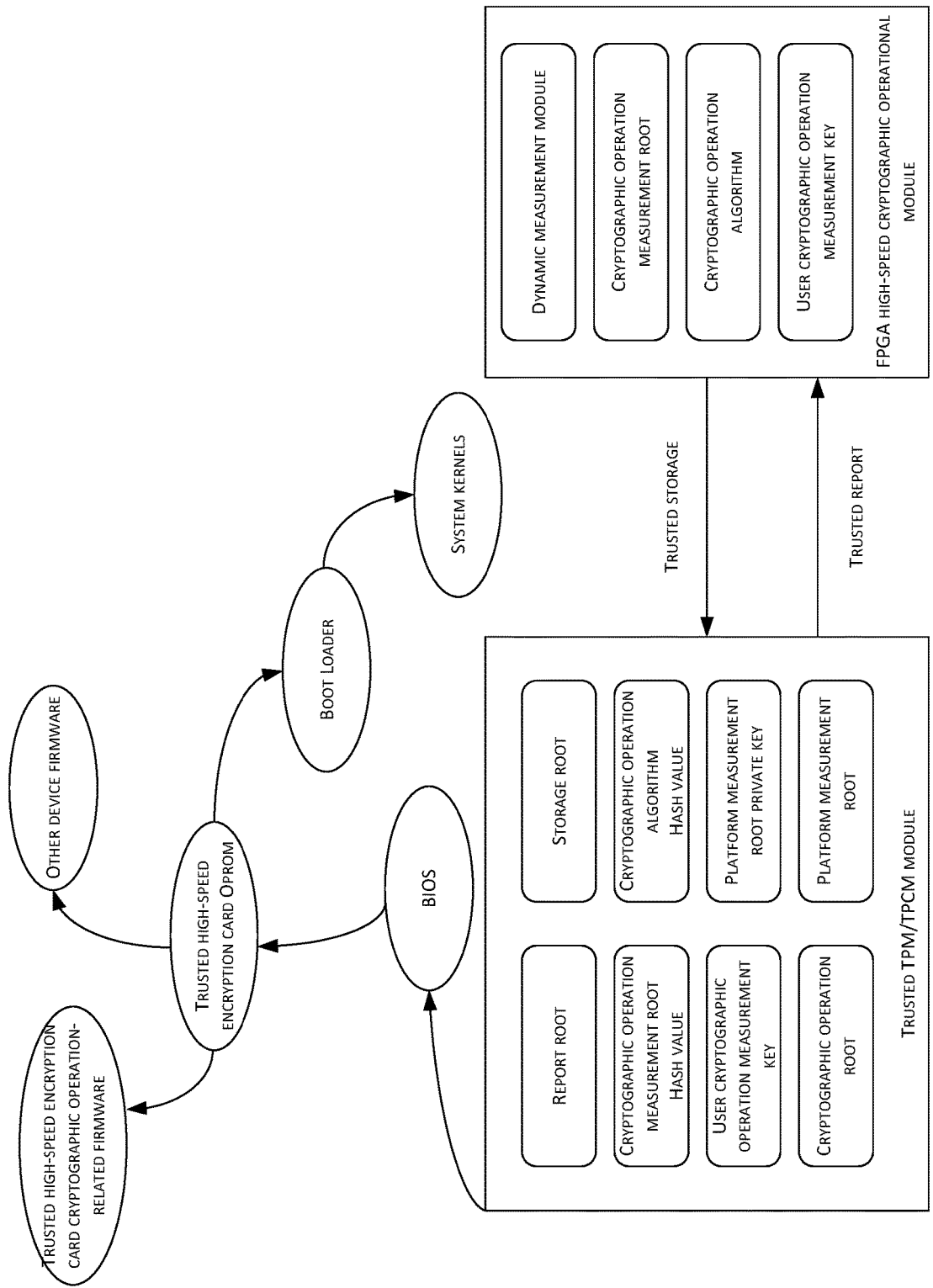
FIG. 7 is a block diagram of another optional measurement chain of trust construction architecture based on a trusted high-speed encryption card according to an embodiment of the present disclosure.

Specifically, based on the trusted high-speed encryption card, a building architecture of a chain of trust is also proposed. FIG. 7 shows a building architecture of a measurement of a chain of trust based on an Oprom extension, which can modify a BIOS of an OEM server manufacturer, to enable the BIOS to measure the integrity of Oprom of a trusted high-speed encryption card. The trusted high-speed Oprom then measures ROM and other firmware of all peripherals.

As shown in FIG. 7, a building architecture of a measurement of a chain of trust based on an Oprom extension mainly shows a delivery of a static measurement of the chain of trust, and may specifically include an integrity measurement of a BIOS performed by a trusted TPM/TCM module, an integrity measurement of an Oprom of a trusted high-speed encryption card performed by the BIOS, a cryptographic operational firmware and other device firmware(s) of the trusted high-speed encryption card performed by the Oprom of the trusted high-speed encryption card, an integrity measurement of a Boot Loader performed by the Oprom of the trusted high-speed encryption card, and an integrity measurement of system kernel(s) performed by the Boot Loader. Data interactions between a trusted TPM/TPCN module and a FPGA high-speed cryptographic operational module may include a trusted storage and a trusted report. The trusted storage may be to send sensitive information associated with high-speed cryptographic operation(s) such as a hash value of the high-speed cryptographic operational firmware, and a measurement root for the cryptographic operation(s), etc., from a FPGA high-speed cryptographic operational module to the trusted TPM/TPCM module for storing in a PCR (with a full name as Program Control Register) value of the trusted TPM/TPCM module to obtain protection from the trusted module. The trusted report may be the trusted TPM/TPCM module to perform a hash calculation on a measurement of firmware(s) associated with high-speed cryptographic operation(s), and after obtaining a hash comparison result, to report thereof to trusted firmware(s) of a FPGA high-speed cryptographic operational module that is/are associated with the high-speed cryptographic operation(s).

It should be noted that, in order to implement a measurement method based on a trusted high-speed encryption card, a trusted security chip manufacturer or a trusted security chip user can be assumed to have placed a public key PK (RPM) of a platform measurement root in a CPU white list mechanism of a device host, and stored a private key SK (RPM) in a trusted security chip, which can specifically be implemented using Intel SGX technology.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, the integrity of an Oprom of a trusted high-speed encryption card in a device can be actively measured by the BIOS. If the integrity of the Oprom of the trusted high-speed encryption card is not corrupted, a firmware associated with a trusted high-speed cryptographic operation, such as the integrity of a cryptographic algorithm, can be measured by the Oprom of the trusted high-speed encryption card, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup.

Figure 8:
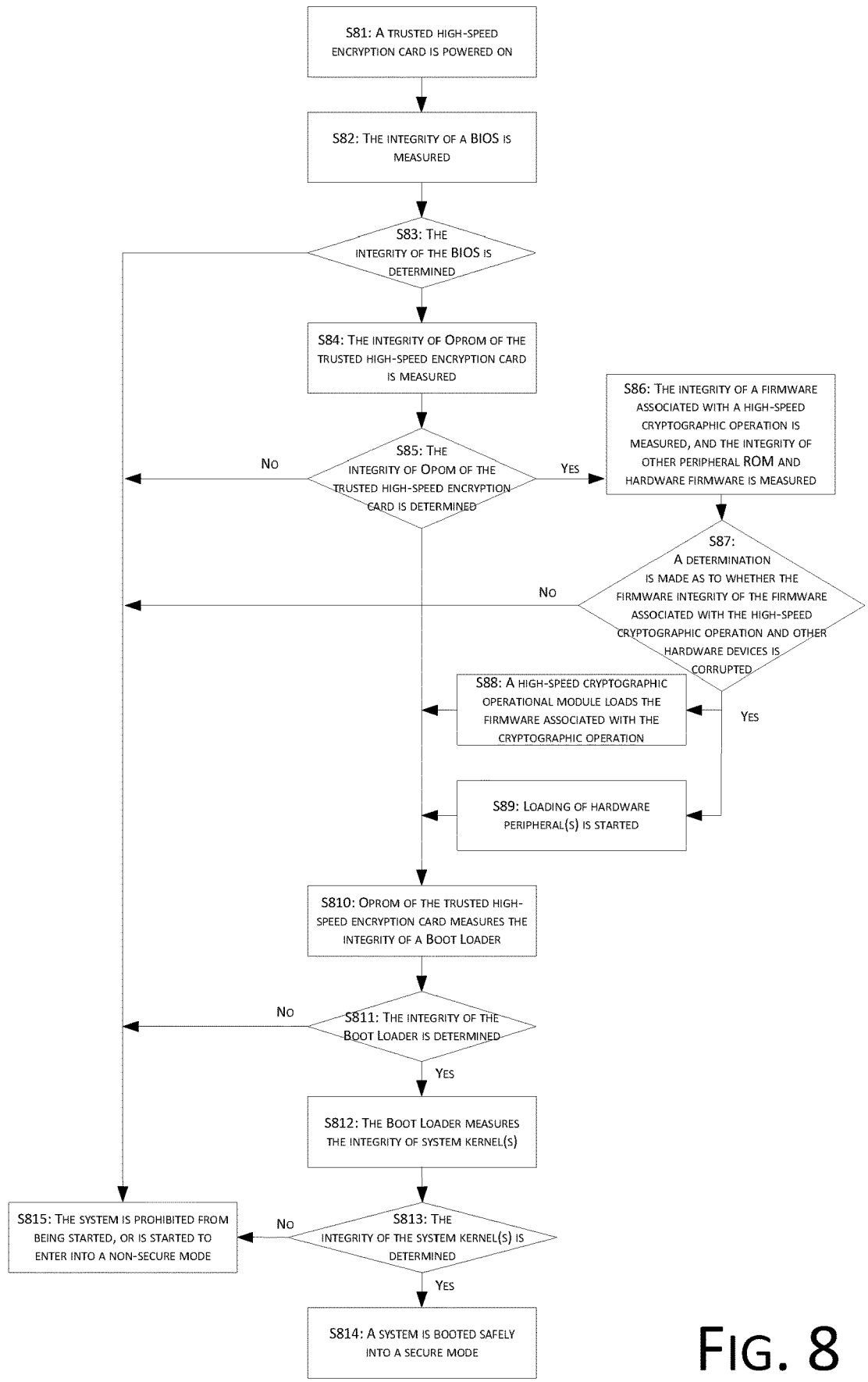
FIG. 8 is a flowchart of another optional measurement method based on a trusted high-speed encryption card according to an embodiment of the present disclosure.

For example, for the building architecture of the chain of trust as shown in FIG. 7, a static measurement starting method of a corresponding trusted high-speed encryption card is shown in FIG. 8. Such method may include the following steps.

Step S81: A trusted high-speed encryption card is powered on.

Step S82: The integrity of a BIOS is measured.

Optionally, a measurement of the integrity of the BIOS can be completed using a platform measurement root of the trusted high-speed encryption card and public and private keys of platform measurement root keys.

Step S83: The integrity of the BIOS is determined.

Optionally, if the integrity of the BIOS is not corrupted, step S84 and step S810 can be performed. Otherwise step S815 is performed.

Step S84: The integrity of Oprom of the trusted high-speed encryption card is measured.

Step S85: The integrity of Oprom of the trusted high-speed encryption card is determined.

Optionally, if the integrity of Oprom of the trusted high-speed encryption card is not corrupted, step S86 and step S810 may be performed. Otherwise step S815 is performed.

Step S86: The integrity of a firmware associated with a high-speed cryptographic operation is measured, and the integrity of other peripheral ROM and hardware firmware is measured.

Optionally, Oprom of the trusted high-speed encryption card can actively measure the integrity of the firmware associated with the trusted high-speed cryptographic operation, as well as the integrity of ROM of hardware peripherals and respective firmware.

Step S87: A determination is made as to whether the firmware integrity of the firmware associated with the high-speed cryptographic operation and other hardware devices is corrupted.

Optionally, if no corruption exists, step S88 and step S89 may be performed. Otherwise step S815 is performed.

Step S88: A high-speed cryptographic operational module loads the firmware associated with the cryptographic operation.

Optionally, if determining that the integrity of the firmware of the high-speed cryptographic operation is not corrupted, the firmware associated with the high-speed cryptographic operation is loaded, and step S810 is performed.

Step S89: Loading of hardware peripheral(s) is started.

Optionally, if determining that the firmware integrity of the other hardware devices is not corrupted, firmware boot peripherals of the other hardware devices are loaded, and step S810 is performed.

Step S810: Oprom of the trusted high-speed encryption card measures the integrity of a Boot Loader.

Step S811: The integrity of the Boot Loader is determined.

Optionally, if the integrity of the Boot Loader is not corrupted, step S812 may be performed, otherwise step S815 is performed.

Step S812: The Boot Loader measures the integrity of system kernel(s).

Step S813: The integrity of the system kernel(s) is determined.

Optionally, if the integrity of the system kernel(s) is not corrupted, step S814 may be performed. Otherwise step S815 is performed.

Step S814: A system is booted safely into a secure mode.

Optionally, after a trusted high-speed encryption card is powered on, the integrity of a BIOS, the integrity of Oprom of the trusted high-speed encryption card, the firmware integrity of a firmware associated with a high-speed password operation and other hardware devices, and the integrity of a Boot Loader, and the integrity of a system kernel may be sequentially measured. Only when it the integrity of all these measured objects is not corrupted can a device be trusted, so that a system can be booted safely and enter into a secure mode.

Step S815: The system is prohibited from being started, or is started to enter into a non-secure mode.

Optionally, after a trusted high-speed encryption card is powered on, the integrity of a BIOS, the integrity of Oprom of the trusted high-speed encryption card, the firmware integrity of a firmware associated with a high-speed password operation and other hardware devices, and the integrity of a Boot Loader, and the integrity of a system kernel may be sequentially measured. As long as the integrity of any of the measured objects is determined to be corrupted, a determination can be made that the device is not trustable. Therefore, a system can be prevented from being started, or the system can be controlled to start and enter into a non-secure mode.

In the method provided in the second embodiment of the present disclosure, a BIOS can actively measure the integrity of an option memory firmware of a trusted high-speed encryption card in a device when an integrity measurement result of the BIOS performed by the trusted security chip indicates that the integrity thereof is not corrupted. When the integrity of the option memory firmware of the trusted high-speed encryption card that is actively measured by the BIOS is not corrupted, the option memory firmware of the trusted high-speed encryption card is triggered to measure the integrity of one or more firmware in the device. If the integrity of the one or more firmware is not corrupted, one or more firmware may be loaded. Otherwise, a system of the device is prohibited from being started, or the system is controlled to enter into a non-secure mode.

It is easy to note that a BIOS can be used to actively measure a trusted high-speed encryption card in a device when an integrity measurement result of the BIOS performed by a trusted security chip indicates that the integrity thereof is not corrupted. Furthermore, the trusted high-speed encryption card can be used to measure at least one firmware. A determination of whether a system of the device is started can be made based on a measurement result, and a measurement of a cryptographic operation can be performed based on a measurement key provided by the trusted security chip. Compared with the existing technologies, the trusted high-speed encryption card in the device can be actively measured, and the measurement of the cryptographic operation can be completed during a process of integrity measurement. This achieves the technical effects of an active measurement and a loading measurement of the cryptographic operation during a startup of the device in the process of integrity measurement by the trusted security chip.

Therefore, the solution of the foregoing second embodiment provided by the present disclosure solves the technical problems of failing to guarantee active measurements of a platform and a system, and loading measurements of cryptographic operations at the same time during a device startup in a process of performing an integrity measurement by a trusted security chip in the existing technologies.

In the foregoing embodiments of the present disclosure, before the BIOS actively measures the integrity of the trusted high-speed encryption card in the device, the method further includes the following steps.

Step S66: The trusted high-speed encryption card is powered on and started.

Step S68: A platform measurement root of the trusted high-speed encryption card is obtained.

Specifically, the platform measurement root may include measurement code(s) for performing integrity measurement(s) on the device. The platform measurement root may be loaded into a memory space of the device when the device is started at the first time, and loaded from the memory to the CPU of the device. It should be noted that, in order to ensure the accuracy of the platform measurement root that is obtained, the trusted high-speed encryption card can encrypt the platform measurement root to obtain a trusted measurement root, load the trusted measurement root into the memory of the motherboard, and then load the trusted measurement root is loaded from the memory into the CPU.

Step S610: A trusted security chip uses the platform measurement root and a key to perform an integrity measurement for the BIOS.

Optionally, a host processor stores a public key of a key pair, and the public key and a private key that encrypts the measurement root together form a pair of asymmetrical measurement keys.

In an optional solution, the host processor decrypts the trusted measurement root using the public key to obtain a measurement root. The measurement root includes a measurement code. The measurement code is executed to obtain a measurement result of the BIOS. The measurement result is then encrypted using the public key to obtain a processing result. The host processor sends the obtained processing result to the security chip. The security chip decrypts the encrypted measurement result using the private key (i.e., the private key that encrypts the measurement root), and the measurement result can thereby be obtained. When the system is started for the first time, the measurement result can be hashed to obtain a hash value, which is stored in a PCR of the trusted chip as a measurement reference value. When the system is started again, a hash value of a measurement result is compared with the measurement reference value. If the hash value of the measurement result is the same as the measurement reference value, a determination is made that the BIOS is complete, i.e., the integrity of the BIOS is not corrupted. If the hash value of the measurement result is different from the measurement reference value, a determination is made that the BIOS is incomplete, i.e., the integrity of the BIOS is corrupted, and so a platform and a system are considered to have destructive attacks.

It should be noted that the integrity of at least one firmware in a device can also be measured using the above method.

In the above embodiments of the present disclosure, when an integrity measurement of the BIOS indicates that the integrity is corrupted, the system of the device is forbidden from booting, or the system is controlled to enter into a non-secure mode.

In an optional solution, the integrity of a BIOS is measured during a startup of a device. If the integrity of the BIOS is compromised, a determination can be made that the BIOS is incomplete and the device is not trustable. A system of the device is forbidden from booting, or the system is controlled to enter into a non-secure mode, to ensure the security of the startup of the device.

In the above embodiments of the present disclosure, after the integrity of one or more firmware in the device is measured by the option memory firmware of the trusted high-speed encryption card at step S64, the method further includes the following steps.

Step S612, the option memory firmware of the trusted high-speed encryption card measures the integrity of a Boot Loader.

Specifically, the Boot Loader can be a program that runs before a system kernel or an application program runs. Using such program, a hardware device can be initiated, and a map of a memory space can be established, thereby bringing a hardware and software environment of the system to a suitable state, in order to prepare a correct environment for involving system kernels at the end.

In an alternative solution, the integrity of the Boot Loader can be measured using the method that measures the integrity of the BIOS as described above.

Step S316: The Boot Loader is triggered to measure the integrity of a system kernel of the device when the integrity of the Boot Loader measured by the option memory firmware of the trusted high-speed encryption card is not corrupted.

In an alternative solution, the integrity of the system kernel can be measured using the method that measures the integrity of the BIOS as described above.

Step S616: When the integrity of the Boot Loader measured by the option memory firmware of the trusted high-speed encryption card is corrupted, the system of the device is prohibited from booting, or the system is controlled to enter into a non-secure mode.

In an optional solution, during the startup of the device, after the firmware associated with the trusted high-speed cryptographic operation is loaded or the firmware booting peripherals of the other hardware devices is loaded, the integrity of the Boot Loader can be measured by Oprom of the trusted high-speed encryption card. If the integrity of the Boot Loader is not corrupted, the Boot Loader can be determined to be complete, and thereby the Boot Loader is executed. The integrity of the system kernel(s) of the device is measured by the Boot Loader. In response to determining that the integrity of the Boot Loader is corrupted, the Boot Loader can be determined to be incomplete, and the device is not trustable. Thus, the system of the device can be forbidden from being started, or the system is controlled to enter a non-secure mode, to ensure the security of the startup of the device.

In the foregoing embodiments of the present disclosure, after the Boot Loader is triggered to measure the system kernel of the device at step S614, the method may further include the following steps.

Step S618: A security boot system, and/or a control system enter(s) into a secure mode when the integrity of the system kernel measured by the Boot Loader is not corrupted.

Step S620: When the integrity of the system kernel measured by the Boot Loader is corrupted, the system of the device is prohibited from being started, or the system is controlled to enter into a non-secure mode.

In an optional solution, the integrity of the system kernel of the device can be measured by the Boot Loader in response to determining that the integrity of the Boot Loader is not corrupted. If the integrity of the system kernel is determined to be not corrupted, the system kernel can be determined to be complete, and the device is trustable. The device can be controlled to start up the system safely, and control the system to enter a secure mode. If determining that the integrity of the system kernel is corrupted, the system kernel can be determined to be incomplete, and the device is not trustable. The system of the device can be prohibited from being started, or the system is started to enter into a non-secure mode, to ensure the security of the startup of the device.

It should be noted that the foregoing method embodiments are all expressed as a series of action combinations for the sake of description. One skilled in the art should understand that the present disclosure is not limited by the described sequences of actions, because certain steps may be performed in other sequences or concurrently in accordance with the present disclosure. Furthermore, one skilled in the art should also understand that the embodiments described in the specification all belong to exemplary embodiments, and actions and modules that are involved may not be necessarily required by the present disclosure.

Through the description of the above embodiments, one skilled in the art can clearly understand that the methods according to the foregoing embodiments can be implemented using software plus a necessary general hardware platform, and apparently can also be implemented by hardware. In many cases, the former is a better implementation. Based on such understanding, the essence of the technical solutions of the present disclosure or the parts that contribute to the existing technologies may be embodied in a form of a software product. Such computer software product is stored in a storage media (such as a ROM/RAM, a disk, an optical disk), and includes a number of instructions for causing a terminal device (which may be a mobile phone, a computer, a server, or a network device, etc.) to perform the methods described in various embodiments of the present disclosure.

Third Embodiment

Figure 9:
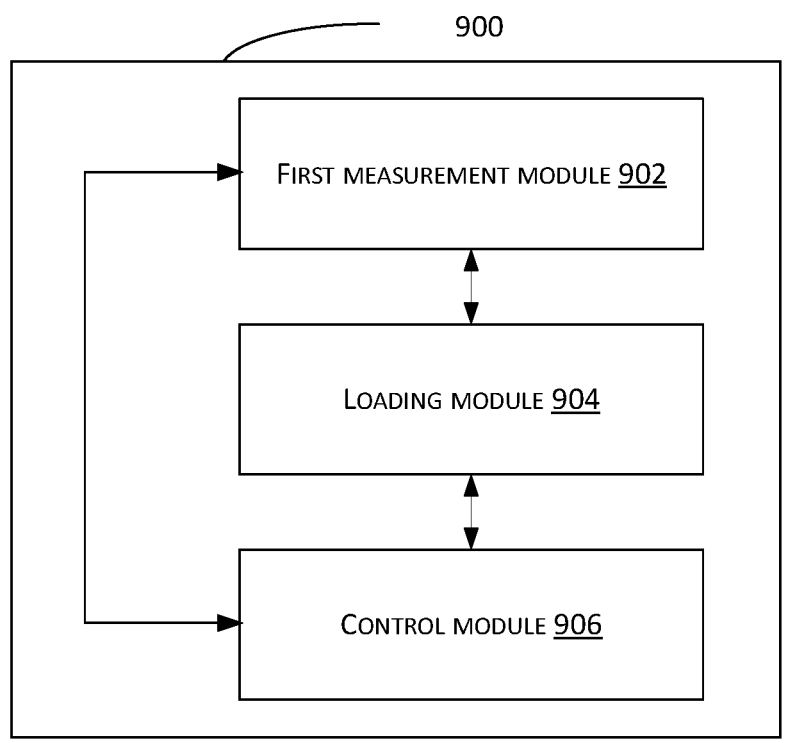
FIG. 9 is a schematic diagram of a measurement apparatus based on a trusted high-speed encryption card according to the third embodiment of the present disclosure.

According to the embodiments of the present disclosure, a trusted high-speed encryption card based measurement apparatus for implementing the above measurement method based on a trusted high-speed encryption card is also provided. As shown in FIG. 9, the apparatus 900 includes: a first measurement module 902, a loading module 904, and a control module 906, wherein:

the measurement module 902 is configured to cause a BIOS to actively measure at least one firmware in a device if an integrity measurement result made by a trusted security chip for the BIOS indicates that the integrity thereof is not corrupted; the loading module 904 is configured to load one or more firmware when the integrity of the one or more firmware in the device actively measured by the BIOS is not corrupted; and the control module 906 is configured to prohibit a system of the device from being started up, or control the system to enter into a non-secure mode when the integrity of one or more firmware in the device actively measured by the BIOS is corrupted.

Specifically, the trusted security chip may be a trusted TPM/TPCM module in a trusted high-speed encryption card as described above, and may perform a measurement of the integrity of a BIOS of an OEM (with a full name as Original Equipment Manufacturer) server manufacturer.

Optionally, the firmware may include at least one of: a trusted high-speed cryptographic algorithmic firmware, a peripheral storage device, a memory, and a hardware device.

It should be noted that the first measurement module 902, the loading module 904, and the control module 906 correspond to steps S32 to S36 in the first embodiment. Examples and application scenarios implemented by these three modules are the same as those of the corresponding steps, but are not limited to the content disclosed in the above first embodiment. It should be noted that the above modules can be operated as a part of the apparatus in the computer terminal 20 provided in the first embodiment.

In the method provided by the foregoing third embodiment of the present disclosure, when an integrity measurement of a BIOS performed by a trusted security chip indicates that the integrity of the BIOS is not corrupted, the BIOS may actively measure at least one firmware in a device. When the integrity of one or more firmware in the device measured by the BIOS is not corrupted, the one or more firmware may be loaded. When the integrity of one or more firmware in the device measured by the BIOS is corrupted, a system of the device may be forbidden from being started up, or the system may be controlled to enter into a non-secure mode.

It is easy to note that a BIOS can actively measure at least one firmware in a device when an integrity measurement result performed by a trusted security chip for the BIOS indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solution of the foregoing third embodiment provided by the present disclosure solves the technical problems of failing to guarantee active measurements of a platform and a system, and loading measurements of cryptographic operations at the same time during a device startup in a process of performing an integrity measurement for a trusted security chip in the existing technologies.

In the foregoing embodiments of the present disclosure, the apparatus further includes: a starting module, an acquisition module, and a second measurement module, wherein:

the starting module is configured to power up and start a trusted high-speed encryption card; the acquisition module is configured to obtain a platform measurement root of the trusted high-speed encryption card; and the second measurement module is configured to cause the trusted security chip to use the platform measurement root and a key to perform an integrity measurement for the BIOS.

In the above embodiments of the present disclosure, the control module is further configured to prohibit the system from booting, or control the system to enter into a non-secure mode when the integrity measurement result of the BIOS indicates that the integrity is corrupted.

In the foregoing embodiments of the present disclosure, the apparatus further includes: a third measurement module and a triggering module, wherein:

the third measurement module is configured to cause the BIOS to measure the integrity of a Boot Loader; the triggering module is configured to trigger the Boot Loader to measure the integrity of a system kernel of the device when the integrity of the Boot Loader measured by the BIOS is not corrupted; and the control module further configured to prohibit the system from booting, or control the system to enter into a non-secure mode when the integrity of the Boot Loader measured by the BIOS is corrupted.

In the foregoing embodiments of the present disclosure, the control module is further configured to securely start the system of the device, and/or control the system to enter into the secure mode when the integrity of the system kernel measured by the Boot Loader is not corrupted; and prohibit the system of the device from booting, or control the system to enter into the non-secure mode when the integrity of the system kernel measured by the Boot Loader is corrupted.

Fourth Embodiment

Figure 10:
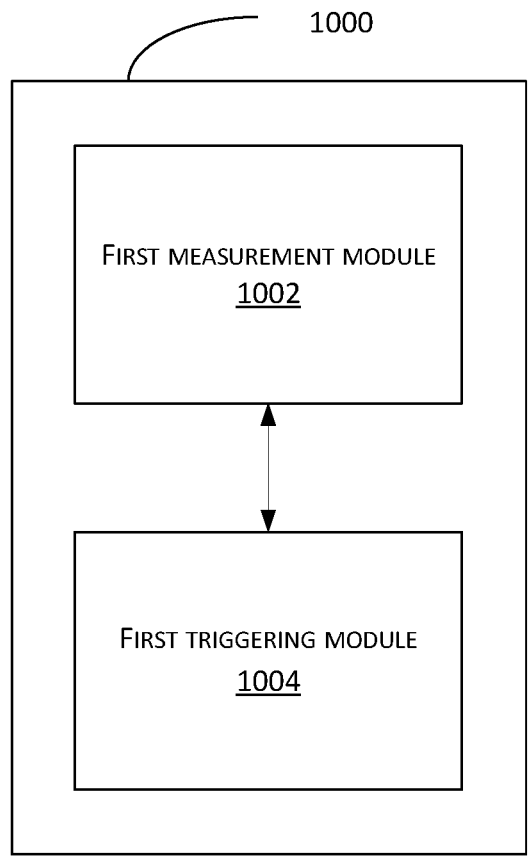
FIG. 10 is a schematic diagram of a measurement apparatus based on a trusted high-speed encryption card according to the fourth embodiment of the present disclosure.

According to the embodiments of the present disclosure, there is also provided a trusted high-speed encryption card based measurement apparatus for implementing the above measurement method based on a trusted high-speed encryption card. As shown in FIG. 10, the apparatus 1000 includes: a first measurement module 1002 and a first triggering module 1004.

The first measurement module 1002 is configured to cause BIOS to actively measure the integrity of an option memory firmware of a trusted high-speed encryption card in a device when an integrity measurement result of the BIOS performed by a trusted security chip indicates that the integrity thereof is not corrupted; and the triggering module 1004 is configured to trigger the option memory firmware of the trusted high-speed encryption card is triggered to measure the integrity of one or more firmware in the device when the integrity of the option memory firmware of the trusted high-speed encryption card that is actively measured by the BIOS is not corrupted, wherein the one or more firmware are loaded when the integrity of one or more firmware is not corrupted, and a system of the device is forbidden from being started, or the system is controlled to enter into a non-secure mode otherwise.

Specifically, the trusted high-speed encryption card may be the same as the trusted high-speed encryption card in the first embodiment, and details thereof are not described herein.

Optionally, the firmware may include at least one of: a trusted high-speed cryptographic algorithmic firmware, a peripheral storage device, a memory, and a hardware device.

It should be noted that the foregoing first measurement module 1002 and the first triggering module 1004 correspond to step S62 to step S64 in the second embodiment. Examples and application scenarios implemented by these three modules are the same as those of the corresponding steps, but are not limited to the content disclosed in the above first embodiment. It should be noted that the above modules can be operated as a part of the apparatus in the computer terminal 20 provided in the first embodiment.

In the method provided in the fourth embodiment of the present disclosure, a BIOS can actively measure the integrity of an option memory firmware of a trusted high-speed encryption card in a device when an integrity measurement result of the BIOS performed by the trusted security chip indicates that the integrity thereof is not corrupted. When the integrity of the option memory firmware of the trusted high-speed encryption card that is actively measured by the BIOS is not corrupted, the option memory firmware of the trusted high-speed encryption card is triggered to measure the integrity of one or more firmware in the device. If the integrity of the one or more firmware is not corrupted, one or more firmware may be loaded. Otherwise, a system of the device is prohibited from being started, or the system is controlled to enter into a non-secure mode.

It is easy to note that a BIOS can be used to actively measure a trusted high-speed encryption card in a device when an integrity measurement result of the BIOS performed by a trusted security chip indicates that the integrity thereof is not corrupted. Furthermore, the trusted high-speed encryption card can be used to measure at least one firmware. A determination of whether a system of the device is started can be made based on a measurement result, and a measurement of a cryptographic operation can be performed based on a measurement key provided by the trusted security chip. Compared with the existing technologies, the trusted high-speed encryption card in the device can be actively measured, and the measurement of the cryptographic operation can be completed during a process of integrity measurement. This achieves the technical effects of an active measurement and a loading measurement of the cryptographic operation during a startup of the device in the process of integrity measurement by the trusted security chip.

Therefore, the solution of the foregoing fourth embodiment provided by the present disclosure solves the technical problems of failing to guarantee active measurements of a platform and a system, and loading measurements of cryptographic operations at the same time during a device startup in a process of performing an integrity measurement by a trusted security chip in the existing technologies.

In the foregoing embodiment of the present disclosure, the apparatus further includes: a starting module, an acquisition module, and a second measurement module, wherein:

the starting module is configured to power on and start a trusted high-speed encryption card; the acquisition module is configured to obtain a platform measurement root of the trusted high-speed encryption card; and the second measurement module is configured to cause the trusted security chip to use the platform measurement root and a key to perform an integrity measurement for the BIOS.

In the above embodiment of the present disclosure, the apparatus further includes: a control module.

The control module is configured to prohibit the system from booting, or control the system to enter into a non-secure mode when the integrity measurement result of the BIOS indicates that the integrity is corrupted.

In the foregoing embodiment of the present disclosure, the apparatus further includes: a third measurement module and a second triggering module, wherein:

the third measurement module is configured to cause the BIOS to measure the integrity of a Boot Loader; the second triggering module is configured to trigger the Boot Loader to measure the integrity of a system kernel of the device when the integrity of the Boot Loader measured by the BIOS is not corrupted; and the control module further configured to prohibit the system from booting, or control the system to enter into the non-secure mode when the integrity of the Boot Loader measured by the BIOS is corrupted.

In the foregoing embodiments of the present disclosure, the control module is further configured to securely start the system of the device, and/or control the system to enter into the secure mode when the integrity of the system kernel measured by the Boot Loader is not corrupted; and prohibit the system of the device from booting, or control the system to enter into the non-secure mode when the integrity of the system kernel measured by the Boot Loader is corrupted.

Fifth Embodiment

Figure 11:
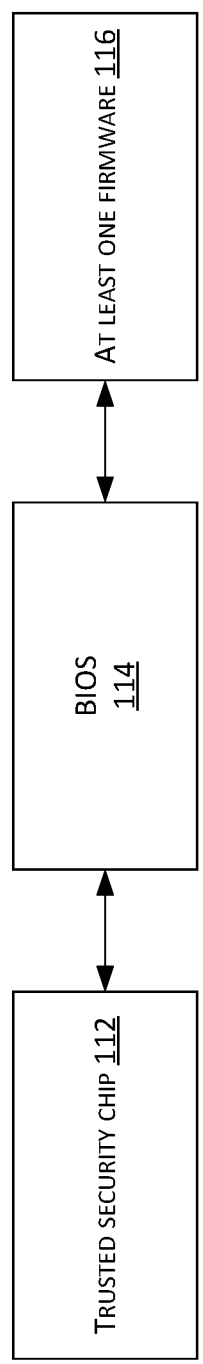
FIG. 11 is a schematic diagram of a measurement device based on a trusted high-speed encryption card according to the fifth embodiment of the present disclosure.

According to the embodiments of the present disclosure, a measurement device based on a trusted high-speed encryption card is further provided. As shown in FIG. 11, the device includes: a trusted security chip 112, a BIOS 114, and at least one firmware 116.

the trusted security chip 112 configured to measure the integrity of the BIOS 114; the BIOS configured to actively measure the at least one firmware 116 in a device if an integrity measurement result made by a trusted security chip for the BIOS indicates that the integrity thereof is not corrupted, load one or more firmware if the integrity of the one or more firmware in the device actively measured by the BIOS is not corrupted, and forbid a system of the device from being started or control the system to enter into a non-secure mode if the integrity of the one or more firmware in the device actively measured by the BIOS is corrupted.

Specifically, the trusted security chip may be a trusted TPM/TPCM module in a trusted high-speed encryption card as described above, and may perform a measurement of the integrity of a BIOS of an OEM (with a full name as Original Equipment Manufacturer) server manufacturer.

Optionally, the firmware may include at least one of: a trusted high-speed cryptographic algorithmic firmware, a peripheral storage device, a memory, and a hardware device.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, a firmware associated with a trusted high-speed cryptographic operation, such as the integrity of a cryptographic algorithm, can be actively measured by the BIOS, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup.

In the method provided by the foregoing fifth embodiment of the present disclosure, when an integrity measurement of a BIOS performed by a trusted security chip indicates that the integrity of the BIOS is not corrupted, the BIOS may actively measure at least one firmware in a device. When the integrity of one or more firmware in the device measured by the BIOS is not corrupted, the one or more firmware may be loaded. When the integrity of one or more firmware in the device measured by the BIOS is corrupted, a system of the device may be forbidden from being started up, or the system may be controlled to enter into a non-secure mode.

It is easy to note that a BIOS can actively measure at least one firmware in a device when an integrity measurement result performed by a trusted security chip for the BIOS indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solution of the foregoing fifth embodiment provided by the present disclosure solves the technical problems of failing to guarantee active measurements of a platform and a system, and loading measurements of cryptographic operations at the same time during a device startup in a process of performing an integrity measurement for a trusted security chip in the existing technologies.

In the above embodiments of the present disclosure, the device further includes: a trusted high-speed encryption card.

The trusted high-speed encryption card is used for powering up and booting; and the trusted security chip is further used for obtaining a platform measurement root of the trusted high-speed encryption card, and using the platform measurement root and a key to perform an integrity measurement for the BIOS.

In the above embodiments of the present disclosure, the BIOS is further configured to prohibit the system from booting, or control the system to enter into a non-secure mode when the integrity measurement result of the BIOS indicates that the integrity is corrupted.

In the foregoing embodiment of the present disclosure, the device further includes: a Boot Loader.

The BIOS is also configured to measure the integrity of a Boot Loader, trigger the Boot Loader to measure the integrity of a system kernel of the device when the integrity of the Boot Loader measured by the BIOS is not corrupted, and prohibit the system from booting, or control the system to enter into the non-secure mode when the integrity of the Boot Loader measured by the BIOS is corrupted.

In the above embodiments of the present disclosure, the BIOS is further configured to securely start the system and/or control the system to enter into the secure mode when the integrity of the system kernel measured by the Boot Loader is not corrupted; and prohibit the system of the device from booting, or control the system to enter into the non-secure mode when the integrity of the system kernel measured by the Boot Loader is corrupted.

Sixth Embodiment

Figure 12:
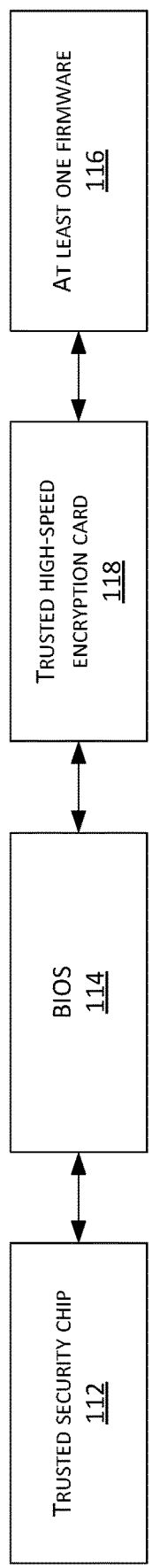
FIG. 12 is a schematic diagram of a measurement device based on a trusted high-speed encryption card according to the sixth embodiment of the present disclosure.

According to the embodiments of the present disclosure, a measurement device based on a trusted high-speed encryption card is further provided. As shown in FIG. 12, the device includes: a trusted security chip 112, a BIOS 114, at least one firmware 116, and a trusted high-speed encryption card. 118.

The trusted security chip 112 is configured to measure the integrity of the BIOS 114; the BIOS is configured to actively measure the integrity of an option memory firmware of the trusted high-speed encryption card 118 in the device when an integrity measurement result of the BIOS performed by the trusted security chip indicates that the integrity thereof is not corrupted; and the option memory firmware of the trusted high-speed encryption card is configured to measure the integrity of one or more firmware 116 in the device when the integrity of the option memory firmware of the trusted high-speed encryption card that is actively measured by the BIOS is not corrupted, wherein the one or more firmware are loaded when the integrity of one or more firmware is not corrupted, and a system of the device is forbidden from being started, or the system is controlled to enter into a non-secure mode otherwise.

Specifically, the trusted security chip may be a trusted TPM/TPCM module in the above-mentioned trusted high-speed encryption card, and may perform BIOS integrity of an OEM (original equipment manufacturer, full name Original Equipment Manufacturer) server manufacturer.

Specifically, the trusted high-speed encryption card may be the same as the trusted high-speed encryption card in the first embodiment, and details thereof are not described herein.

Optionally, the firmware may include at least one of: a trusted high-speed cryptographic algorithmic firmware, a peripheral storage device, a memory, and a hardware device.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, the integrity of an Oprom of a trusted high-speed encryption card in a device can be actively measured by the BIOS. If the integrity of the Oprom of the trusted high-speed encryption card is not corrupted, a firmware associated with a trusted high-speed cryptographic operation, such as the integrity of a cryptographic algorithm, can be measured by the Oprom of the trusted high-speed encryption card, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup.

In the method provided in the sixth embodiment of the present disclosure, a BIOS can actively measure the integrity of an option memory firmware of a trusted high-speed encryption card in a device when an integrity measurement result of the BIOS performed by the trusted security chip indicates that the integrity thereof is not corrupted. When the integrity of the option memory firmware of the trusted high-speed encryption card that is actively measured by the BIOS is not corrupted, the option memory firmware of the trusted high-speed encryption card is triggered to measure the integrity of one or more firmware in the device. If the integrity of the one or more firmware is not corrupted, one or more firmware may be loaded. Otherwise, a system of the device is prohibited from being started, or the system is controlled to enter into a non-secure mode.

It is easy to note that a BIOS can be used to actively measure a trusted high-speed encryption card in a device when an integrity measurement result of the BIOS performed by a trusted security chip indicates that the integrity thereof is not corrupted. Furthermore, the trusted high-speed encryption card can be used to measure at least one firmware. A determination of whether a system of the device is started can be made based on a measurement result, and a measurement of a cryptographic operation can be performed based on a measurement key provided by the trusted security chip. Compared with the existing technologies, the trusted high-speed encryption card in the device can be actively measured, and the measurement of the cryptographic operation can be completed during a process of integrity measurement. This achieves the technical effects of an active measurement and a loading measurement of the cryptographic operation during a startup of the device in the process of integrity measurement by the trusted security chip.

Therefore, the solution of the foregoing sixth embodiment provided by the present disclosure solves the technical problems of failing to guarantee active measurements of a platform and a system, and loading measurements of cryptographic operations at the same time during a device startup in a process of performing an integrity measurement by a trusted security chip in the existing technologies.

In the above embodiments of the present disclosure, the trusted high-speed encryption card is also used for powering up and booting; the trusted security chip is also used for obtaining a platform measurement root of the trusted high-speed encryption card, and using the platform measurement root and a key to measure the integrity of the BIOS.

In the above embodiments of the present disclosure, the BIOS is further configured to prohibit the system of the device from booting, or control the system to enter the non-secure mode if the integrity measurement result of the BIOS indicates that the integrity thereof is corrupted.

In the foregoing embodiments of the present disclosure, the device further includes: a Boot Loader.

The option memory firmware of the trusted high-speed encryption card is further configured to measure the integrity of the Boot Loader; and the option memory firmware of the BIOS is further configured to trigger the Boot Loader to measure the integrity of a system kernel of the device when the integrity of the Boot Loader measured by the option memory firmware of the trusted high-speed encryption card is not corrupted, and prohibit the system of the device from booting, or control the system to enter into the non-secure mode when the integrity of the Boot Loader measured by the option memory firmware of the trusted high-speed encryption card is corrupted.

In the foregoing embodiments of the present disclosure, the BIOS is further configured to securely start the system of the device, and/or control the system to enter into the secure mode when the integrity of the system kernel measured by the Boot Loader is not corrupted; and prohibit the system of the device from booting, or control the system to enter into the non-secure mode when the integrity of the system kernel measured by the Boot Loader is corrupted.

Seventh Embodiment

Figure 13:
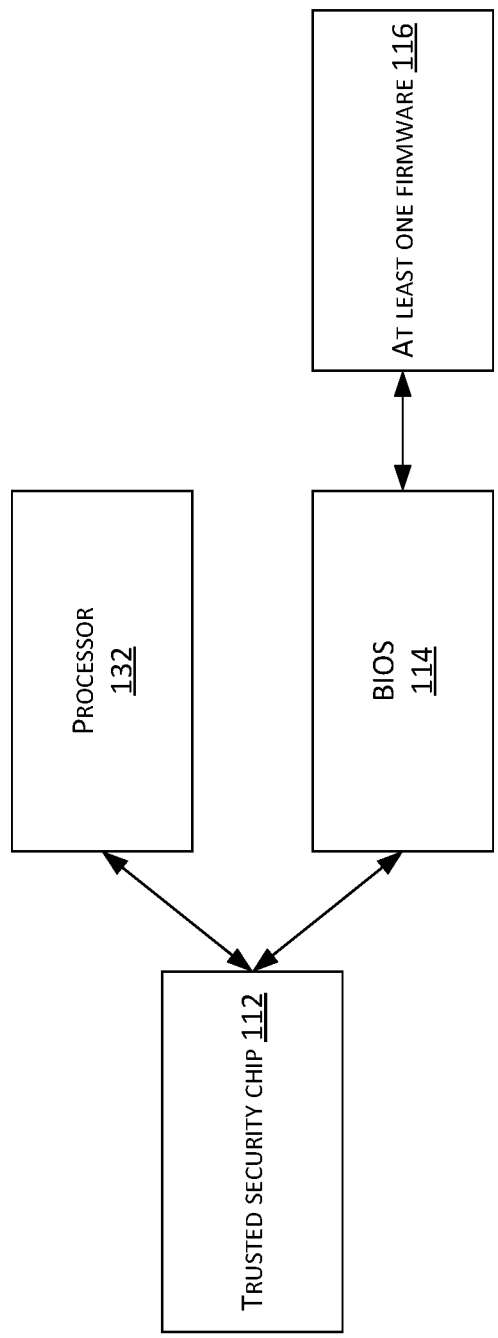
FIG. 13 is a schematic diagram of a measurement system based on a trusted high-speed encryption card according to the seventh embodiment of the present disclosure.

According to the embodiments of the present disclosure, a measurement system based on a trusted high-speed encryption card is further provided. As shown in FIG. 13, the system includes: a trusted security chip 112, a BIOS 114, at least one firmware 116, and a processor 132, wherein:

the trusted security chip 112 is configured to perform an integrity measurement on the BIOS 114; the BIOS 114 actively measures at least one firmware in a device when a result of the integrity measurement indicates that the integrity thereof is not corrupted; and the processor 132 is coupled to the trusted security chip and configured to complete a measurement of a cryptographic operational firmware based on a measurement key provided by the trusted security chip, wherein one or more firmware are loaded when the integrity of the one or more firmware in the device actively measured by the BIOS is not corrupted, and a system of the device is prohibited from booting or the system is controlled to enter into a non-secure mode if the integrity of the one or more firmware actively measured by the BIOS is corrupted.

Specifically, the trusted security chip may be a trusted TPM/TPCM module in a trusted high-speed encryption card as described above, and may perform a measurement of the integrity of a BIOS of an OEM (with a full name as Original Equipment Manufacturer) server manufacturer. The processor may be a reconfigurable high-speed cryptographic operational module such as FPGA, and a measurement of a cryptographic operation can be completed cooperatively by the trusted security chip and the FPGA high-speed cryptographic operational module.

Optionally, the firmware may include at least one of: a trusted high-speed cryptographic algorithmic firmware, a peripheral storage device, a memory, and a hardware device.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, a firmware associated with a trusted high-speed cryptographic operation, such as the integrity of a cryptographic algorithm, can be actively measured by the BIOS, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup. Furthermore, a measurement of a cryptographic operational firmware can be completed by a FPGA high-speed cryptographic operational module using a measurement key provided by the trusted security chip to implement a measurement of the cryptographic operation.

In the method provided by the foregoing seventh embodiment of the present disclosure, when an integrity measurement of a BIOS performed by a trusted security chip indicates that the integrity of the BIOS is not corrupted, the BIOS may actively measure at least one firmware in a device. Furthermore, a processor can complete a measurement of a cryptographic operational firmware based on a measurement key provided by the trusted security chip. When the integrity of one or more firmware in the device measured by the BIOS is not corrupted, the one or more firmware may be loaded. When the integrity of one or more firmware in the device measured by the BIOS is corrupted, a system of the device may be forbidden from being started up, or the system may be controlled to enter into a non-secure mode.

It is easy to note that a BIOS can actively measure at least one firmware in a device when an integrity measurement result performed by a trusted security chip for the BIOS indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solution of the foregoing seventh embodiment provided by the present disclosure solves the technical problems of failing to guarantee active measurements of a platform and a system, and loading measurements of cryptographic operations at the same time during a device startup in a process of performing an integrity measurement for a trusted security chip in the existing technologies.

Eighth Embodiment

Figure 14:
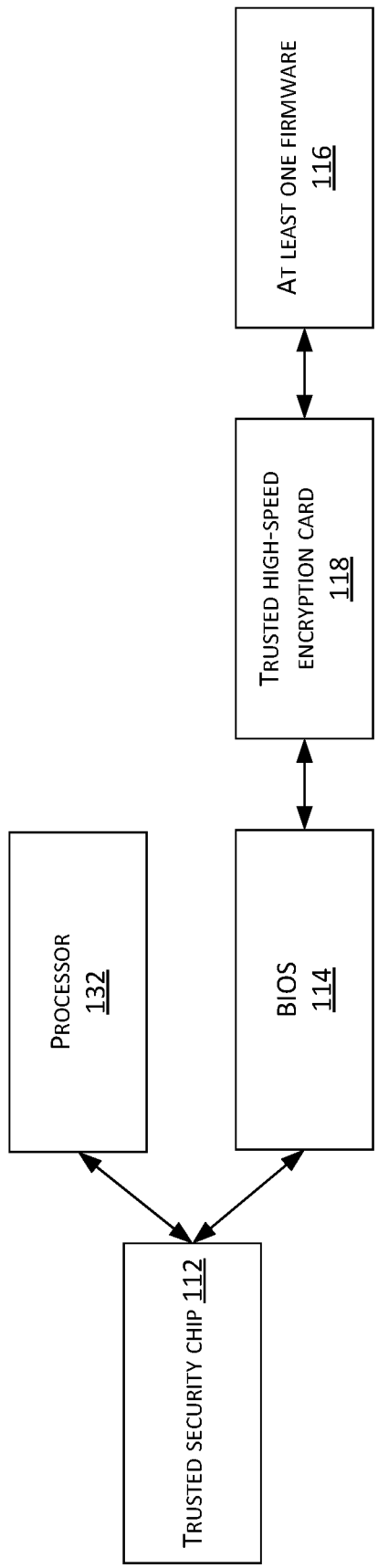
FIG. 14 is a schematic diagram of a measurement system based on a trusted high-speed encryption card according to the eighth embodiment of the present disclosure.

According the embodiments of the present disclosure, a measurement system based on a trusted high-speed encryption card is further provided. As shown in FIG. 14, the system includes: a trusted security chip 112, a BIOS 114, at least one firmware 116, a trusted high-speed encryption card 118, and a processor 132, wherein:

the trusted security chip 112 is configured to perform an integrity measurement on the BIOS 114; the BIOS actively measures the integrity of an option memory firmware of the trusted high-speed encryption card 118 in a device when a result of the integrity measurement indicates that the integrity thereof is not corrupted; the option memory firmware of the trusted high-speed encryption card is configured to trigger to measure the device to measure the integrity of one or more firmware 116 when the integrity thereof is not corrupted; the processor 132 is coupled to the trusted security chip and configured to complete a measurement of a cryptographic operational firmware based on a measurement key provided by the trusted security chip, wherein the one or more firmware are loaded if the integrity of the one or more firmware is not corrupted, or otherwise a system of the device is forbidden from being started or the system is controlled to enter into a non-secure mode.

Specifically, the trusted security chip may be a trusted TPM/TPCM module in a trusted high-speed encryption card as described above, and may perform a measurement of the integrity of a BIOS of an OEM (with a full name as Original Equipment Manufacturer) server manufacturer. The processor may be a reconfigurable high-speed cryptographic operational module such as FPGA, and a measurement of a cryptographic operation can be completed cooperatively by the trusted security chip and the FPGA high-speed cryptographic operational module.

Optionally, the firmware may include at least one of: a trusted high-speed cryptographic algorithmic firmware, a peripheral storage device, a memory, and a hardware device.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, the integrity of an Oprom of a trusted high-speed encryption card in a device can be actively measured by the BIOS. If the integrity of the Oprom of the trusted high-speed encryption card is not corrupted, a firmware associated with a trusted high-speed cryptographic operation, such as the integrity of a cryptographic algorithm, can be measured by the Oprom of the trusted high-speed encryption card, and the integrity of a ROM of a hardware peripheral and its firmware can also be actively measured, to determine whether a firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded. If a corruption exists, a system of the device is prevented from being started, or the system is started as a non-secure mode, to ensure the security of a device startup. Furthermore, a measurement of a cryptographic operational firmware can be completed by a FPGA high-speed cryptographic operational module using a measurement key provided by the trusted security chip to implement a measurement of the cryptographic operation.

In the method provided in the eighth embodiment of the present disclosure, a BIOS can actively measure the integrity of an option memory firmware of a trusted high-speed encryption card in a device when an integrity measurement result of the BIOS performed by the trusted security chip indicates that the integrity thereof is not corrupted. When the integrity of the option memory firmware of the trusted high-speed encryption card that is actively measured by the BIOS is not corrupted, the option memory firmware of the trusted high-speed encryption card is triggered to measure the integrity of one or more firmware in the device. Furthermore, a processor can complete a measurement of a cryptographic operational firmware based on a measurement key provided by the trusted security chip. Thereby, if the integrity of the one or more firmware is not corrupted, one or more firmware may be loaded. Otherwise, a system of the device is prohibited from being started, or the system is controlled to enter into a non-secure mode.

It is easy to note that a BIOS can be used to actively measure a trusted high-speed encryption card in a device when an integrity measurement result of the BIOS performed by a trusted security chip indicates that the integrity thereof is not corrupted. Furthermore, the trusted high-speed encryption card can be used to measure at least one firmware. A determination of whether a system of the device is started can be made based on a measurement result, and a measurement of a cryptographic operation can be performed based on a measurement key provided by the trusted security chip. Compared with the existing technologies, the trusted high-speed encryption card in the device can be actively measured, and the measurement of the cryptographic operation can be completed during a process of integrity measurement. This achieves the technical effects of an active measurement and a loading measurement of the cryptographic operation during a startup of the device in the process of integrity measurement by the trusted security chip.

Therefore, the solution of the foregoing eighth embodiment provided by the present disclosure solves the technical problems of failing to guarantee active measurements of a platform and a system, and loading measurements of cryptographic operations at the same time during a device startup in a process of performing an integrity measurement by a trusted security chip in the existing technologies.

Ninth Embodiment

According to the embodiments of the present disclosure, an embodiment of a measurement method based on a trusted high-speed encryption card is also provided. It should be noted that steps shown in a flowchart of the accompanying drawings may be executed in a computer system such as a set of computer executable instructions. Furthermore, although a logical order is shown in a flowchart, in some cases, steps shown or described may be performed in a different order than the one described therein.

Figure 15:
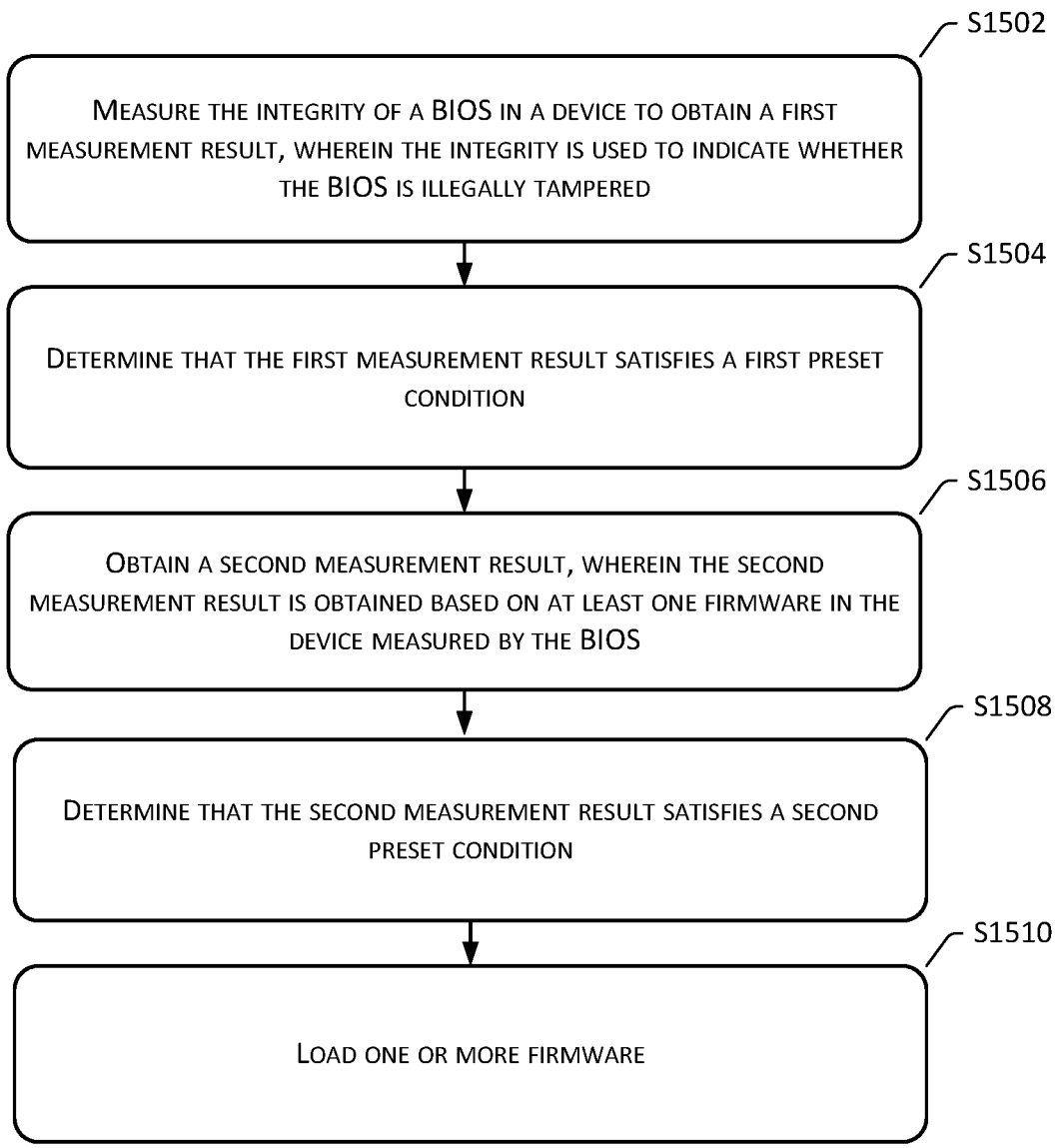
FIG. 15 is a flowchart of a measurement method based on a trusted high-speed encryption card according to the ninth embodiment of the present disclosure.

In the above operating environment, the present disclosure provides a measurement method based on a trusted high-speed encryption card as shown in FIG. 15.

Specifically, the trusted high-speed encryption card may be the same as the trusted high-speed encryption card in the first embodiment, and details thereof are not repeatedly described herein.

FIG. 15 is a flow chart of a measurement method based on a trusted high-speed encryption card according to the ninth embodiment of the present disclosure. As shown in FIG. 15, the method may include the following steps.

Step S152: Measure the integrity of a BIOS in a device to obtain a first measurement result, wherein the integrity is used to indicate whether the BIOS is illegally tampered.

Specifically, a measurement of the integrity of the BIOS may be completed using a platform measurement root of a trusted security chip, and public and private keys of platform measurement root keys. The trusted security chip may be a trusted TPM/TPCM module in a trusted high-speed encryption card. The integrity of a BIOS of an OEM server manufacturer can be measured.

Step S154: Determine that the first measurement result satisfies a first preset condition.

Specifically, the first preset condition may be the integrity of the BIOS being not corrupted. After comparing a hash value of the BIOS with a preset hash value, a determination of whether the integrity of the BIOS is corrupted may be made. When the integrity of the BIOS is not corrupted, the first measurement result is determined to satisfy the first preset condition.

Step S156: Obtain a second measurement result, wherein the second measurement result is obtained based on at least one firmware in the device measured by the BIOS.

Optionally, the firmware may include at least one of: a trusted high-speed cryptographic algorithmic firmware, a peripheral storage device, a memory, and a hardware device.

Specifically, a building architecture of a chain of trust based on a trusted high-speed encryption card is proposed. FIG. 4 shows a measurement of a building architecture of a chain of trust based on a BIOS extension, which can modify a BIOS of a OEM server manufacturer to enable the BIOS to actively measure ROM and other hardware firmware of all peripherals.

It should be noted that the integrity measurement method of at least one firmware is consistent with the integrity measurement method of the BIOS.

Step S158: Determine that the second measurement result satisfies a second preset condition.

Specifically, the second preset condition may be the integrity of the at least one firmware being not corrupted. After comparing a hash value of the at least one firmware with a preset hash value, a determination of whether the integrity of the at least one firmware is corrupted may be made. The second measurement result is determined to satisfy the second predetermined condition if the integrity of the at least one firmware is not corrupted.

Step S1510: Load one or more firmware.

In an optional solution, in order to implement an integrity measurement of a device, a trusted security chip may measure the integrity of a BIOS during a process of device startup. If a result of the integrity measurement of the BIOS indicates that the integrity thereof is not corrupted, the BIOS can be used to actively measure a firmware associated with a trusted high-speed cryptographic operation, such as the integrity of a cryptographic algorithmic operation, and may also actively measure the integrity of ROM of hardware peripherals and firmware thereof to determine whether the firmware integrity of the firmware associated with the trusted high-speed cryptographic operation and other hardware devices is corrupted. If no corruption exists, the firmware associated with the trusted high-speed cryptographic operation can be loaded, or firmware boot peripherals of the other hardware devices can be loaded.

The method provided in the foregoing ninth embodiment of the present disclosure measures the integrity of a BIOS to obtain a first measurement result. In a case that the first measurement result meets a first preset condition, the BIOS can be used to actively measure at least one firmware in a device. One or more firmware may be loaded upon determining that a second measurement result satisfies a second preset condition.

It is easy to note that a BIOS can actively measure at least one firmware in a device through when an integrity measurement result of the BIOS performed by a trusted security chip indicates that the integrity thereof is not corrupted, and a determination of whether to start the device can be made according to a measurement result. A measurement of a cryptographic operation can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solution provided by the ninth embodiment of the present disclosure solves the technical problems of failing to guarantee active measurements of a platform and a system, and loading measurements of cryptographic operations at the same time during a device startup in a process of performing an integrity measurement by a trusted security chip in the existing technologies.

In the foregoing embodiments of the present disclosure, before the BIOS actively measures the at least one firmware in the device to obtain the second measurement result at step S156, the method may further include the following steps.

Step S1512: Power on and start a trusted high-speed encryption card.

Step S1514: Obtain a platform measurement root of the trusted high-speed encryption card.

Specifically, the platform measurement root may include measurement code(s) for performing integrity measurement(s) on the device. The platform measurement root may be loaded into a memory space of the device when the device is started at the first time, and loaded from the memory to the CPU of the device. It should be noted that, in order to ensure the accuracy of the platform measurement root that is obtained, the trusted high-speed encryption card can encrypt the platform measurement root to obtain a trusted measurement root, load the trusted measurement root into the memory of the motherboard, and then load the trusted measurement root is loaded from the memory into the CPU.

Step S1516: A trusted security chip uses the platform measurement root and a key to perform an integrity measurement for the BIOS.

Optionally, a host processor stores a public key of a key pair, and the public key and a private key that encrypts the measurement root together form a pair of asymmetrical measurement keys.

In an optional solution, the host processor decrypts the trusted measurement root using the public key to obtain a measurement root. The measurement root includes a measurement code. The measurement code is executed to obtain a measurement result of the BIOS. The measurement result is then encrypted using the public key to obtain a processing result. The host processor sends the obtained processing result to the security chip. The security chip decrypts the encrypted measurement result using the private key (i.e., the private key that encrypts the measurement root), and the measurement result can thereby be obtained. When the system is started for the first time, the measurement result can be hashed to obtain a hash value, which is stored in a PCR of the trusted chip as a measurement reference value. When the system is started again, a hash value of a measurement result is compared with the measurement reference value. If the hash value of the measurement result is the same as the measurement reference value, a determination is made that the BIOS is complete, i.e., the integrity of the BIOS is not corrupted. If the hash value of the measurement result is different from the measurement reference value, a determination is made that the BIOS is incomplete, i.e., the integrity of the BIOS is corrupted, and so a platform and a system are considered to have destructive attacks.

In the foregoing embodiments of the present disclosure, upon determining that the first measurement result does not satisfy the first preset condition, or the second measurement result does not satisfy the second preset condition, the system of the device is prohibited from booting, or the system is controlled to enter into a non-secure mode.

In an optional solution, in order to implement an integrity measurement of a device, an integrity measurement of a BIOS may be performed by a trusted security chip during a startup process of the device. When a result of the integrity measurement of the BIOS indicates that the integrity thereof is not corrupted, a firmware associated with a trusted high-speed cryptographic operation, such as the integrity of a cryptographic algorithm, can be actively measured by the BIOS, and the integrity of a ROM of a hardware peripheral and its firmware can also be actively measured, to determine whether a firmware integrity of the firmware associated with the trusted high-speed cryptographic operation and other hardware devices is corrupted. If a corruption exists, a system of the device is prevented from being started, or the system is started as a non-secure mode, to ensure the security of a device startup.

In the foregoing embodiments of the present disclosure, measuring the integrity of the BIOS in the device at step S152 includes:

Step S1522: Determine whether a hash value of the BIOS is the same as a preset hash value.

Specifically, the preset hash value may be a hash value of the BIOS calculated when the device is powered on. If these two are the same, this indicates that the integrity of the BIOS is not corrupted. Otherwise the integrity of the BIOS is corrupted.

Tenth Embodiment

The embodiments of the present disclosure may provide a computer terminal. The computer terminal may be any computer terminal device in a group of computer terminals.

Optionally, in the present embodiment, the computer terminal may also be replaced with a terminal device such as a mobile terminal.

Optionally, in the present embodiment, the computer terminal may be located in at least one network device of a plurality of network devices of a computer network.

In the present embodiment, the computer terminal may execute program codes of the following steps in a measurement method based on a trusted high-speed encryption card: a BIOS actively measuring at least one firmware in a device if an integrity measurement result made by a trusted security chip for the BIOS indicates that the integrity thereof is not corrupted; loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

Figure 16:
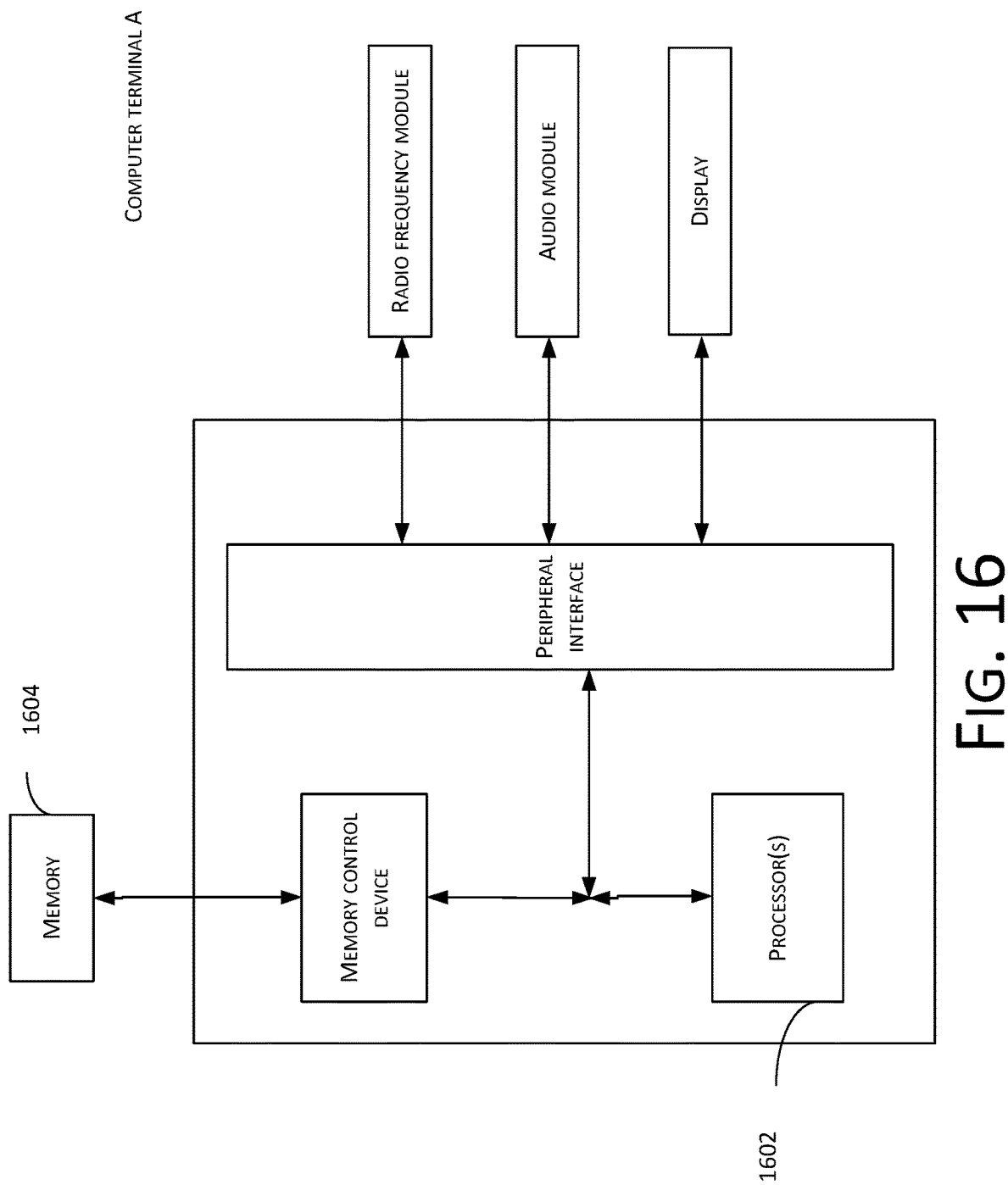
FIG. 16 is a structural block diagram of a computer terminal according to an embodiment of the present disclosure.

Optionally, FIG. 16 is a structural block diagram of a computer terminal according to an embodiment of the present disclosure. As shown in FIG. 16, the computer terminal A may include one or more (only one shown in the figure) processors 1602 and a memory 1604.

The memory can be used to store software programs and modules, such as the program instruction/module corresponding to the measurement methods and apparatuses based on a trusted high-speed encryption card in the embodiments of the present disclosure. The processor(s) perform(s) various functional applications and data processing by running software program(s) and module(s) stored in the memory, i.e., implementing the measurement methods based on the trusted high-speed encryption card as described above. The memory may include a high-speed random access memory, and may also include non-volatile memory, such as one or more magnetic storage devices, a flash memory, or other non-volatile solid state memory. In some examples, the memory can further include storage devices remotely located relative to the processor(s). These storage devices can be connected to the terminal A via a network. Examples of such network include, but are not limited to, the Internet, an intranet, a local area network, a mobile communication network, and a combination thereof.

The processor(s) may invoke information and application program(s) stored in the memory through a transmission device to perform the following steps: a BIOS actively measuring at least one firmware in a device if an integrity measurement result made by a trusted security chip for the BIOS indicates that the integrity thereof is not corrupted; loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

Optionally, the processor(s) may further execute program codes of the following steps: powering on and starting the trusted high-speed encryption card before the BIOS actively measures the at least one firmware in the device; obtaining a platform measurement root of the trusted high-speed encryption card; the security chip using the platform measurement root and a key to measure the integrity of the BIOS.

Optionally, the processor(s) may further execute program codes of the following steps: prohibiting the system of the device from booting or controlling the system to enter into the non-secure mode in response to determining that the integrity measurement result of the BIOS indicates that the integrity thereof is corrupted.

Optionally, the processor(s) may further execute program codes of the following steps: the BIOS measuring the integrity of a Boot Loader after loading the one or more firmware; triggering the Boot Loader to measure the integrity of a system kernel of the device if the integrity of the Boot Loader measured by the BIOS is not corrupted; and prohibiting the system of the device from booting or controlling the system to enter into the non-secure mode if the integrity of the Boot Loader measured by the BIOS is corrupted.

Optionally, the processor(s) may further execute program codes of the following steps: after triggering the Boot Loader to measure the system kernel of the device, securely starting the system and/or controlling the system to enter the secure mode if a result of measuring the integrity of the kernel of the system by the Boot Loader indicates that no corruption exists; and prohibiting the system of the device from booting or controlling the system to enter into the non-secure mode if the result of measuring the integrity of the kernel of the system by the Boot Loader indicates that a corruption exists.

Using the embodiments of the present disclosure, when an integrity measurement of a BIOS performed by a trusted security chip indicates that the integrity of the BIOS is not corrupted, the BIOS may actively measure at least one firmware in a device. When the integrity of one or more firmware in the device measured by the BIOS is not corrupted, the one or more firmware may be loaded. When the integrity of one or more firmware in the device measured by the BIOS is corrupted, a system of the device may be forbidden from being started up, or the system may be controlled to enter into a non-secure mode.

It is easy to note that a BIOS can actively measure at least one firmware in a device when an integrity measurement result performed by a trusted security chip for the BIOS indicates that the integrity thereof is not corrupted, and a determination of whether to start a system of the device is made based on a measurement result. Moreover, a measurement of a cryptographic operational firmware can be completed based on a measurement key provided by the trusted security chip. Compared with the existing technologies, at least one firmware in a device can be actively measured, and a measurement of a cryptographic operation can be completed when an integrity measurement is performed, thus achieving the technical effects of guaranteeing active measurements and a loading measurement of the cryptographic operation at the time of device startup when the integrity measurement is performed by a trusted security chip.

Therefore, the solutions of the embodiments provided by the present disclosure solves the technical problems of failing to guarantee active measurements of a platform and a system, and loading measurements of cryptographic operations at the same time during a device startup in a process of performing an integrity measurement for a trusted security chip in the existing technologies.

The processor(s) can invoke information and application program(s) stored in the memory through the transmission device to perform the following steps: a BIOS actively measuring the integrity of an option memory firmware of a trusted high-speed encryption card in a device when an integrity measurement result made by a trusted security chip indicates that the integrity of the BIOS is not corrupted; triggering the option memory firmware of the trusted high-speed encryption card to measure the integrity of one or more firmware in the device if the integrity of the option memory firmware of the trusted high-speed encryption card that is actively measured by the BIOS is not corrupted, wherein the one or more firmware are loaded when the integrity of the one or more firmware is not corrupted, or otherwise a system of the device is forbidden from being started or the system is controlled to enter into a non-secure mode.

Optionally, the processor(s) may further execute program codes of the following steps: after the integrity of one or more firmware in the device measured by the trusted high-speed encryption card, the option memory firmware of the trusted high-speed encryption card measuring the integrity of the Boot Loader; triggering the Boot Loader to measure the integrity of a system kernel of the device when the integrity of the Boot Loader measured by the option memory firmware of the trusted high-speed encryption card is not corrupted; and forbidding the system of the device from booting or controlling the system to enter into the non-secure mode when the integrity of the Boot Loader measured by the option memory firmware of the trusted high-speed encryption card is not corrupted.

One skilled in the art can understand that the structure shown in FIG. 16 is merely illustrative, and the computer terminal can also be a terminal device, such as a smart phone (such as an Android mobile phone, an iOS mobile phone, etc.), a tablet computer, a handheld computer, a mobile Internet device (MID), a PAD, etc. FIG. 16 does not limit the structure of the above electronic device. For example, the computer terminal 20 may also include more or fewer components (such as a network interface, a display device, etc.) than the ones shown in FIG. 16, or have a different configuration than that shown in FIG. 16.

One of ordinary skill in the art may understand that all or part of the steps of the foregoing embodiments may be completed through a program to instruct hardware associated with a terminal device. The program may be stored in a computer readable storage media. The storage media may include a flash disk, a read-only memory (ROM), a random access memory (RAM), a magnetic disk, or an optical disk, etc.

Eleventh Embodiment

The embodiments of the present disclosure also provide a storage media. Optionally, in the present embodiment, the storage media may be used to store program codes executed by the measurement method based on the trusted high-speed encryption card provided in the first embodiment.

Optionally, in the present embodiment, the foregoing storage media may be located in any computer terminal of a group of computer terminals in a computer network, or in any mobile terminal of a group of mobile terminals.

Optionally, in the present embodiment, the storage media is configured to store program codes used for performing the following steps: a BIOS actively measuring at least one firmware in a device if an integrity measurement result made by a trusted security chip for the BIOS indicates that the integrity thereof is not corrupted; loading one or more firmware if the integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

Optionally, in the present embodiment, the storage media is configured to store program codes used for performing the following steps: a BIOS actively measuring the integrity of an option memory firmware of a trusted high-speed encryption card in a device when an integrity measurement result made by a trusted security chip indicates that the integrity of the BIOS is not corrupted; triggering the option memory firmware of the trusted high-speed encryption card to measure the integrity of one or more firmware in the device if the integrity of the option memory firmware of the trusted high-speed encryption card that is actively measured by the BIOS is not corrupted, wherein the one or more firmware are loaded when the integrity of the one or more firmware is not corrupted, or otherwise a system of the device is forbidden from being started or the system is controlled to enter into a non-secure mode.

The serial numbers of the embodiments of the present disclosure are merely used for description, and do not represent the advantages and disadvantages of the embodiments.

In the foregoing embodiments of the present disclosure, the descriptions of various embodiments are different, and a part that is not detailed in a certain embodiment can be referenced to related descriptions of other embodiments.

In a number of embodiments provided by the present disclosure, it should be understood that the disclosed technical content may be implemented in other manners. The apparatus embodiments described above are merely illustrative. For example, a division of units is only a division of logical functions. In practical implementations, other manners of division may exist. For example, multiple units or components may be combined or may be integrated into another system, or some features can be ignored or not executed. In addition, a mutual coupling, a direct coupling or a communication connection that is shown or discussed may be an indirect coupling or a communication connection through some interface(s), unit(s) or module(s), and may be an electrical or other form.

The units described as separate components may or may not be physically separated, and the components displayed as units may or may not be physical units, i.e., may be located in a single place, or may be distributed among multiple network units. Some or all of the units may be selected according to actual needs to achieve the purpose of the solutions of the embodiments.

In addition, various functional units in each embodiment of the present disclosure may be integrated into a single processing unit. Alternatively, each unit may exist as an independent entity physically. Alternatively or two or more units may be integrated into a single unit. The above integrated unit can be implemented in a form of hardware or in a form of a software functional unit.

The integrated unit, if implemented in a form of a software functional unit and sold or used as a standalone product, may be stored in a computer readable storage media. Based on such understanding, the essence of the technical solutions of the present disclosure, the parts contributing to the existing technologies, or all or part of the technical solutions may be embodied in a form of a software product. Such computer software product is stored in a storage media, and includes a number of instructions to cause a computing device (which may be a personal computer, a server, or a network device, etc.) to perform all or part of the steps of the methods described in various embodiments of the present disclosure. The storage media includes a U disk, a Read-Only Memory (ROM), a Random Access Memory (RAM), a removable hard disk, a magnetic disk, or an optical disk, etc.

The above description is only exemplary embodiments of the present disclosure. It should be noted that one skilled in the art can also make a number of improvements and modifications without departing from the principles of the present disclosure. These improvements and modifications should be considered as the scope of protection of the present disclosure.

The present disclosure can be further understood using the following clauses.

Clause 1: A measurement method based on a trusted high-speed encryption card, comprising: a BIOS actively measuring at least one firmware in a device if an integrity measurement result made by a trusted security chip for the BIOS indicates that an integrity thereof is not corrupted; loading one or more firmware if the integrity of the one or more firmware in the device actively measured by the BIOS is not corrupted; and forbidding a system of the device from being started or controlling the system to enter into a non-secure mode if an integrity of one or more firmware in the device actively measured by the BIOS is corrupted.

Clause 2: The method of Clause 1, wherein the firmware includes at least one of: a trusted high-speed cryptographic algorithmic firmware, a peripheral storage device, a memory, and a hardware device.

Clause 3: The method of Clause 1, wherein before the BIOS actively measuring the at least one firmware in the device, the method further comprises: powering on and starting the trusted high-speed encryption card; obtaining a platform measurement root of the trusted high-speed encryption card; and the trusted security chip using the platform measurement root and a key to perform an integrity measurement for the BIOS.

Clause 4: The method of Clause 3, wherein: the system of the device is prohibited from booting, or the system is controlled to enter into the non-secure mode when the integrity measurement result of the BIOS indicates that the integrity is corrupted.

Clause 5: The method of Clause 1, wherein: after loading the one or more firmware, the method further comprises: the BIOS measuring the integrity of a Boot Loader; triggering the Boot Loader to measure an integrity of a system kernel of the device when the integrity of the Boot Loader measured by the BIOS is not corrupted; and prohibiting the system of device from booting, or controlling the system to enter into the non-secure mode when the integrity of the Boot Loader measured by the BIOS is corrupted.

Clause 6: The method of Clause 5, wherein: after triggering the Boot Loader to measure the integrity of the system kernel of the device. The method further comprises: securely booting the system of the device, and/or controlling the system to enter into the secure mode when the integrity of the system kernel measured by the Boot Loader is not corrupted; and prohibiting the system of the device from booting, or controlling the system to enter into the non-secure mode when the integrity of the system kernel measured by the Boot Loader is corrupted.

Clause 7: A measurement method based on a trusted high-speed encryption card, comprising: a BIOS actively measuring an integrity of an option memory firmware of the trusted high-speed encryption card in a device when an integrity measurement result made by a trusted security chip indicates that the integrity of the BIOS is not corrupted; and triggering the option memory firmware of the trusted high-speed encryption card to measure an integrity of one or more firmware in the device if an integrity of the option memory firmware of the trusted high-speed encryption card that is actively measured by the BIOS is not corrupted, wherein the one or more firmware are loaded when the integrity of the one or more firmware is not corrupted, or otherwise a system of the device is forbidden from being started or the system is controlled to enter into a non-secure mode.

Clause 8: The method of Clause 7, wherein the firmware includes at least one of: a trusted high-speed cryptographic algorithmic firmware, a peripheral storage device, a memory, and a hardware device.

Clause 9: The method of Clause 7, wherein before the BIOS actively measuring the integrity of an option memory firmware of the trusted high-speed encryption card in the device, the method further comprises: powering on and starting the trusted high-speed encryption card; obtaining a platform measurement root of the trusted high-speed encryption card; and the trusted security chip using the platform measurement root and a key to perform an integrity measurement for the BIOS.

Clause 10: The method of Clause 9, wherein the system of the device is prohibited from booting, or the system is controlled to enter the non-secure mode if the integrity measurement result of the BIOS indicates that the integrity thereof is corrupted.

Clause 11: The method of Clause 7, wherein: after the option memory firmware of the trusted high-speed encryption card measuring the integrity of the one or more firmware in the device, the method further comprises: the option memory firmware of the trusted high-speed encryption card measuring an integrity of the Boot Loader; triggering the Boot Loader to measure an integrity of a system kernel of the device when the integrity of the Boot Loader measured by the option memory firmware of the trusted high-speed encryption card is not corrupted; and prohibiting the system of the device from booting, or controlling the system to enter into the non-secure mode when the integrity of the Boot Loader measured by the option memory firmware of the trusted high-speed encryption card is corrupted.

Clause 12: The method of Clause 11, wherein after triggering the Boot Loader to measure the integrity of the system kernel of the device, the method further comprises: securely booting the system of the device, and/or controlling the system to enter into the secure mode when the integrity of the system kernel measured by the Boot Loader is not corrupted; and prohibiting the system of the device from booting, or controlling the system to enter into the non-secure mode when the integrity of the system kernel measured by the Boot Loader is corrupted.

Clause 13: A measurement device based on a trusted high-speed encryption card, comprising: a trusted security chip configured to measure an integrity of a BIOS; and the BIOS configured to actively measure at least one firmware in a device if an integrity measurement result made by a trusted security chip for the BIOS indicates that the integrity thereof is not corrupted, load one or more firmware if the integrity of the one or more firmware in the device actively measured by the BIOS is not corrupted, and forbid a system of the device from being started or control the system to enter into a non-secure mode if the integrity of the one or more firmware in the device actively measured by the BIOS is corrupted.

Clause 14: A measurement device based on a trusted high-speed encryption card, comprising: a trusted security chip configured to measure the integrity of a BIOS; and the BIOS configured to actively measure the integrity of option memory firmware of the trusted high-speed encryption card in a device when an integrity measurement result made by the trusted security chip for the BIOS indicates that the integrity thereof is not corrupted; the option memory firmware configured to measure one or more firmware in the device when the integrity of the option memory firmware of the trusted high-speed encryption card is not corrupted, wherein the one or more firmware are loaded when the integrity of the one or more firmware is not corrupted, or otherwise a system of the device is forbidden from being started or the system is controlled to enter into a non-secure mode.

Clause 15: A storage media comprising a stored program, wherein the program, when running, controls a device in which the storage media is located to perform the following steps: a BIOS actively measuring at least one firmware in a device if an integrity measurement result made by a trusted security chip for the BIOS indicates that an integrity thereof is not corrupted; loading one or more firmware if an integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

Clause 16: A processor, wherein the processor is configured to run a program, and the program performs the following steps when running: a BIOS actively measuring at least one firmware in a device if an integrity measurement result made by a trusted security chip for the BIOS indicates that an integrity thereof is not corrupted; loading one or more firmware if an integrity of the one or more firmware in the device actively measured by the BIOS is not corrupted; and forbidding a system of the device from being started or controlling the system to enter into a non-secure mode if the integrity of one or more firmware in the device actively measured by the BIOS is corrupted.

Clause 17: A measurement system based on a trusted high-speed encryption card, comprising: a trusted security chip configured to perform an integrity measurement on a BIOS, the BIOS actively measuring at least one firmware in a device when a result of the integrity measurement indicates that an integrity thereof is not corrupted; and a processor connected to the trusted security chip and configured to complete a measurement of a cryptographic operational firmware based on a measurement key provided by the trusted security chip, wherein one or more firmware are loaded when an integrity of the one or more firmware in the device actively measured by the BIOS is not corrupted, and a system of the device is prohibited from booting or the system is controlled to enter into a non-secure mode if the integrity of the one or more firmware actively measured by the BIOS is corrupted.

Clause 18: A measurement system based on a trusted high-speed encryption card, comprising: a trusted security chip configured to perform an integrity measurement on a BIOS, the BIOS actively measuring an integrity of an option memory firmware of the trusted high-speed encryption card in a device when a result of the integrity measurement indicates that an integrity of the BIOS is not corrupted; the option memory firmware of the trusted high-speed encryption card configured to trigger to measure the device to measure an integrity of one or more firmware when the integrity thereof is not corrupted; and a processor coupled to the trusted security chip and configured to complete a measurement of a cryptographic operational firmware based on a measurement key provided by the trusted security chip, wherein the one or more firmware are loaded if the integrity of the one or more firmware is not corrupted, or otherwise a system of the device is forbidden from being started or the system is controlled to enter into a non-secure mode.

Clause 19: A data processing method comprising: measuring an integrity of a BIOS in a device to obtain a first measurement result, wherein the integrity is used for determining whether the BIOS is tampered with; determining that the first measurement result satisfies a first preset condition; obtaining a second measurement result, wherein the second measurement result is obtained based on at least one firmware in the device measured by the BIOS; determining the second measurement result satisfies a second preset condition; and loading one or more firmware.

Clause 20: The method of Clause 19, wherein: before the BIOS actively measures the at least one firmware in the device, the method further comprises: powering on and starting a trusted high-speed encryption card; obtaining a platform measurement root of the trusted high-speed encryption card; and using the platform measurement root and a key, by a trusted security chip, to perform an integrity measurement for the BIOS Clause 21: The method of Clause 19, further comprising: prohibiting a system of the device from booting, or controlling the system to enter into a non-secure mode, upon determining that the first measurement result does not satisfy the first preset condition, or the second measurement result does not satisfy the second preset condition.

Clause 22: The method of Clause 19, wherein measuring the integrity of the BIOS in the device comprises: determining whether a hash value of the BIOS is the same as a preset hash value.

What is claimed is:

1. A method implemented by one or more processors, the method comprising:
   powering on and starting a trusted high-speed encryption card;
   obtaining a platform measurement root of the trusted high-speed encryption card; and
   using, by a trusted security chip, the platform measurement root and a key to perform an integrity measurement for a BIOS in a device;
   measuring, by the trusted security chip, the BIOS in the device, to generate an integrity measurement result;
   if the integrity measurement result indicates that the BIOS's integrity is not corrupted, measuring, by the BIOS, at least one firmware in the device;
   if an integrity of the at least one firmware in the device measured by the BIOS is not corrupted, loading, by the trusted security chip, the at least one firmware; and
   if the integrity of the at least one firmware in the device measured by the BIOS is corrupted, prohibiting, by the trusted security chip, a system of the device from being started or controlling the system to enter into a non-secure mode.

2. The method of claim 1, wherein the at least one firmware includes at least one of: a trusted high-speed cryptographic algorithmic firmware, a peripheral storage device, a memory, and a hardware device.

3. The method of claim 1, wherein: the system of the device is prohibited from booting, or the system is controlled to enter into the non-secure mode when the integrity measurement result of the BIOS indicates that the BIOS's integrity is corrupted.

4. The method of claim 1, wherein: after loading the at least one firmware, the method further comprises:
   the BIOS measuring an integrity of a Boot Loader.

5. The method of claim 4, further comprising:
triggering the Boot Loader to measure an integrity of a system kernel of the device when the integrity of the Boot Loader measured by the BIOS is not corrupted; and
prohibiting the system of the device from booting, or controlling the system to enter into the non-secure mode when the integrity of the Boot Loader measured by an option memory firmware of the trusted high-speed encryption card is corrupted.

6. The method of claim 5, wherein: after triggering the Boot Loader to measure the integrity of the system kernel of the device, the method further comprises:
securely booting the system of the device, and/or controlling the system to enter into the secure mode when the integrity of the system kernel measured by the Boot Loader is not corrupted.

7. The method of claim 5, wherein: after triggering the Boot Loader to measure the integrity of the system kernel of the device, the method further comprises:
prohibiting the system of the device from booting, or controlling the system to enter into the non-secure mode when the integrity of the system kernel measured by the Boot Loader is corrupted.

8. An apparatus comprising:
one or more processors; and
memory storing executable instructions that, when executed by the one or more processors, cause the one or more processors to perform acts comprising:
actively measuring, by a BIOS, an integrity of an option memory firmware of a trusted high-speed encryption card in a device when an integrity measurement result made by a trusted security chip indicates that the integrity of the BIOS is not corrupted; and
triggering the option memory firmware of the trusted high-speed encryption card to measure an integrity of one or more firmware in the device if an integrity of the option memory firmware of the trusted high-speed encryption card that is actively measured by the BIOS is not corrupted, wherein the one or more firmware are loaded when the integrity of the one or more firmware is not corrupted, or otherwise a system of the device is prohibited from booting or the system is controlled to enter into a non-secure mode.

9. The apparatus of claim 8, wherein the one or more firmware include at least one of: a trusted high-speed cryptographic algorithmic firmware, a peripheral storage device, a memory, and a hardware device.

10. The apparatus of claim 8, wherein before the BIOS actively measuring the integrity of an option memory firmware of the trusted high-speed encryption card in the device, the acts further comprise:
powering on and starting the trusted high-speed encryption card;
obtaining a platform measurement root of the trusted high-speed encryption card; and
the trusted security chip using the platform measurement root and a key to perform an integrity measurement for the BIOS.

11. The apparatus of claim 10, wherein the system of the device is prohibited from booting, or the system is controlled to enter the non-secure mode if the integrity measurement result of the BIOS indicates that the integrity thereof is corrupted.

12. The apparatus of claim 8, wherein: after the option memory firmware of the trusted high-speed encryption card measuring the integrity of the one or more firmware in the device, the acts further comprise:
the option memory firmware of the trusted high-speed encryption card measuring an integrity of the Boot Loader.

13. The apparatus of claim 12, wherein the acts further comprise:
triggering the Boot Loader to measure an integrity of a system kernel of the device when the integrity of the Boot Loader measured by the option memory firmware of the trusted high-speed encryption card is not corrupted; and
prohibiting the system of the device from booting, or controlling the system to enter into the non-secure mode when the integrity of the Boot Loader measured by the option memory firmware of the trusted high-speed encryption card is corrupted.

14. The apparatus of claim 13, wherein after triggering the Boot Loader to measure the integrity of the system kernel of the device, the acts further comprise:
securely booting the system of the device, and/or controlling the system to enter into the secure mode when the integrity of the system kernel measured by the Boot Loader is not corrupted.

15. The apparatus of claim 13, wherein after triggering the Boot Loader to measure the integrity of the system kernel of the device, the acts further comprise:
prohibiting the system of the device from booting, or controlling the system to enter into the non-secure mode when the integrity of the system kernel measured by the Boot Loader is corrupted.

16. One or more processor-readable media storing executable instructions that, when executed by one or more processors, cause the one or more processors to perform acts comprising:
powering on and starting a trusted high-speed encryption card;
obtaining a platform measurement root of the trusted high-speed encryption card;
using, by a trusted security chip, the platform measurement root and a key to perform an integrity measurement for a BIOS in a device;
measuring an integrity of the BIOS in the device to obtain a first measurement result, wherein the integrity is used for determining whether the BIOS is tampered with;
determining that the first measurement result satisfies a first preset condition;
obtaining a second measurement result, wherein the second measurement result is obtained based on at least one firmware in the device measured by the BIOS;
determining the second measurement result satisfies a second preset condition; and
loading the at least one firmware.

17. The one or more processor-readable media of claim 16, the acts further comprising:
prohibiting a system of the device from booting, or controlling the system to enter into a non-secure mode, upon determining that the first measurement result does not satisfy the first preset condition, or the second measurement result does not satisfy the second preset condition.

18. The one or more processor-readable media of claim 17, wherein measuring the integrity of the BIOS in the device comprises:
determining whether a hash value of the BIOS is the same as a preset hash value.

19. The one or more processor-readable media of claim 16, wherein the at least one firmware includes at least one of: a trusted high-speed cryptographic algorithmic firmware, a peripheral storage device, a memory, and a hardware device.

20. The one or more processor-readable media of claim 16, the acts further comprising:
   the BIOS measuring an integrity of a Boot Loader after loading the at least one firmware.

\* \* \* \* \*